United States Patent
Park et al.

(10) Patent No.: US 11,032,137 B2
(45) Date of Patent: Jun. 8, 2021

(54) WEARABLE ELECTRONIC DEVICE, MAIN ELECTRONIC DEVICE, SYSTEM AND CONTROL METHOD THEREOF

(71) Applicant: Samsung Electronics Co., Ltd., Suwon-si (KR)

(72) Inventors: Ji Hyun Park, Seongnam-si (KR); Kwang Sub Son, Suwon-si (KR); Byoung Tack Roh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 340 days.

(21) Appl. No.: 14/734,220

(22) Filed: Jun. 9, 2015

(65) Prior Publication Data
US 2015/0358201 A1    Dec. 10, 2015

(30) Foreign Application Priority Data

Jun. 9, 2014    (KR) .................. 10-2014-0069527

(51) Int. Cl.
| | | |
|---|---|---|
| *H04L 12/24* | (2006.01) | |
| *G06F 3/0482* | (2013.01) | |
| *H04W 4/50* | (2018.01) | |
| *G06F 3/0484* | (2013.01) | |
| *H04W 4/80* | (2018.01) | |

(Continued)

(52) U.S. Cl.
CPC ........ *H04L 41/0813* (2013.01); *G06F 3/0482* (2013.01); *G06F 3/04842* (2013.01); *G06F 3/04847* (2013.01); *H04L 41/22* (2013.01); *H04M 1/72412* (2021.01); *H04M 1/72448* (2021.01); *H04M 19/04* (2013.01); *H04W 4/50* (2018.02); *H04W 4/80* (2018.02);
(Continued)

(58) Field of Classification Search
CPC ......... G09B 19/00; G06F 15/16; G06F 3/013; G06F 3/04; G06F 3/048; H04N 5/4403; H04W 4/14; H04W 4/00; G04G 21/00; H04L 41/00; H04M 1/00; H04M 19/00; H04M 2250/00
See application file for complete search history.

(56) References Cited

U.S. PATENT DOCUMENTS

| | | | |
|---|---|---|---|
| 6,244,873 B1 * | 6/2001 | Hill .................. | G06F 3/015 379/110.01 |
| 6,696,973 B1 | 2/2004 | Ritter et al. | |

(Continued)

FOREIGN PATENT DOCUMENTS

| | | |
|---|---|---|
| CN | 105101155 A | 11/2015 |
| EP | 1247373 | 10/2002 |

(Continued)

OTHER PUBLICATIONS

European Search Report issued for EP 15171276.7 dated Nov. 5, 2015, 11 pgs.

(Continued)

*Primary Examiner* — Jennifer N To
*Assistant Examiner* — Qi Wan

(57) ABSTRACT

A wearable electronic device includes: an input module configured to receive a user manipulation for changing a configuration setting value of a main electronic device; and a communication module configured to transmit a control signal for changing a configuration setting value to the main electronic device.

22 Claims, 15 Drawing Sheets

(51) Int. Cl.
   *H04M 19/04* (2006.01)
   *H04M 1/72412* (2021.01)
   *H04M 1/72448* (2021.01)
   *G04G 21/04* (2013.01)

(52) U.S. Cl.
   CPC ......... *G04G 21/04* (2013.01); *H04M 2250/02* (2013.01); *H04M 2250/06* (2013.01)

(56) References Cited

U.S. PATENT DOCUMENTS

| | | | |
|---|---|---|---|
| 8,407,614 B2 | 3/2013 | Banks | |
| 8,433,778 B1* | 4/2013 | Shreesha | H04N 5/4403 709/218 |
| 8,661,367 B2 | 2/2014 | Woo | |
| 9,417,770 B2 | 8/2016 | Banks | |
| 9,614,685 B2 | 4/2017 | Lehtovirta et al. | |
| 9,935,835 B2 | 4/2018 | Lehtovirta et al. | |
| 2001/0014441 A1 | 8/2001 | Hill et al. | |
| 2002/0090953 A1* | 7/2002 | Aburai | H04W 60/00 455/456.1 |
| 2003/0151982 A1* | 8/2003 | Brewer | G04G 21/00 368/46 |
| 2004/0185915 A1 | 9/2004 | Ihara et al. | |
| 2005/0149872 A1* | 7/2005 | Fong | G06F 3/0481 715/727 |
| 2005/0182979 A1* | 8/2005 | Gross | G06F 9/4443 713/300 |
| 2007/0150554 A1* | 6/2007 | Simister | G06F 9/4445 709/219 |
| 2007/0240074 A1* | 10/2007 | Banks | G06F 3/04847 715/771 |
| 2007/0274307 A1* | 11/2007 | Karino | H04L 45/22 370/389 |
| 2007/0283011 A1 | 12/2007 | Rakowski et al. | |
| 2008/0247344 A1* | 10/2008 | Bahl | H04W 52/0274 370/310 |
| 2009/0238213 A1* | 9/2009 | Kasatani | H04L 67/34 370/503 |
| 2009/0244023 A1* | 10/2009 | Kim | G06F 3/0416 345/173 |
| 2009/0300525 A1* | 12/2009 | Jolliff | H04M 1/72544 715/764 |
| 2009/0323987 A1* | 12/2009 | Yang | H03G 1/02 381/109 |
| 2010/0228836 A1 | 9/2010 | Lehtovirta et al. | |
| 2011/0066971 A1* | 3/2011 | Forutanpour | G06F 9/4443 715/788 |
| 2011/0107235 A1* | 5/2011 | Woo | H04N 21/42222 715/748 |
| 2011/0238731 A1* | 9/2011 | Corson | H04N 5/4403 709/203 |
| 2012/0066675 A1* | 3/2012 | Shelansky | G06F 9/44526 717/178 |
| 2012/0092822 A1 | 4/2012 | Mooring et al. | |
| 2013/0088629 A1 | 4/2013 | Ryu | |
| 2013/0303213 A1* | 11/2013 | Kennard | H04W 4/14 455/466 |
| 2014/0154987 A1* | 6/2014 | Lee | H04M 1/7253 455/41.2 |
| 2014/0204718 A1 | 7/2014 | Heinberg et al. | |
| 2014/0240122 A1* | 8/2014 | Roberts | G16H 40/63 340/539.11 |
| 2014/0340334 A1* | 11/2014 | Cho | G06F 3/013 345/173 |
| 2015/0082406 A1* | 3/2015 | Park | H04L 63/0853 726/9 |
| 2015/0088786 A1* | 3/2015 | Anandhakrishnan | F24F 11/001 706/11 |
| 2015/0215443 A1* | 7/2015 | Heo | H04M 1/0202 455/556.1 |
| 2018/0295027 A1 | 10/2018 | Lehtovirta et al. | |

FOREIGN PATENT DOCUMENTS

| | | |
|---|---|---|
| EP | 2739020 | 6/2014 |
| EP | 2899952 | 7/2015 |
| JP | 2009164780 A | 7/2009 |
| JP | 2010278499 A | 12/2010 |
| JP | 2012060494 A | 3/2012 |
| JP | 2012129834 A | 7/2012 |
| KR | 10-2001-0107158 A | 12/2001 |
| KR | 10-2010-0130478 A | 12/2010 |
| KR | 10-2011-0006201 A | 1/2011 |
| KR | 10-2011-0049239 A | 5/2011 |
| KR | 10-2011-0121101 A | 11/2011 |
| KR | 10-2012-0040919 A | 4/2012 |

OTHER PUBLICATIONS

European Search Report dated Aug. 13, 2019 in connection with European Patent Application No. 19 18 6024, 12 pages.
Notification of Reason for Refusal in connection with Korean Application No. 10-2014-0069527 dated Jul. 22, 2020, 13 pages.

* cited by examiner

WEARABLE ELECTRONIC DEVICE, MAIN ELECTRONIC DEVICE, SYSTEM AND CONTROL METHOD THEREOF

CROSS-REFERENCE TO RELATED APPLICATION(S) AND CLAIM OF PRIORITY

The present application is related to and claims the benefit under 35 U.S.C. § 119(a) of a Korean patent application filed on, Jun. 9, 2014 in the Korean Intellectual Property Office and assigned Serial number 10-2014-0069527, the entire disclosure of which is hereby incorporated by reference.

TECHNICAL FIELD

The present disclosure relates to a wearable electronic device transmitting data to and receiving data from another electronic device, a main electronic device, a system, and a control method thereof.

BACKGROUND

With the development of electronic technology, various types of electronic products have been developed and spread. Especially, electronic devices such as TVs, mobile phones, PCs, and notebook PCs are widely used in most typical homes.

As various electronic devices are spread, various services operating in conjunction with a network between devices have been developed. For example, wearable electronic devices such as smart watches and smart glasses can provide various services in conjunction with main electronic devices such as smartphones.

The above-mentioned wearable electronic devices can receive various information from main electronic devices. However, when the wearable electronic devices receive information regardless of their states or main electronic devices' states, user's inconvenience or unnecessary power consumption may occur.

In order to change configuration setting values of wearable electronic device and main electronic devices, it is inconvenient to change a configuration setting value of each device.

Additionally, a wearable electronic device can have various types depending on wearing methods and forms, but a main electronic device may send information uniformly without considering the characteristics of each device so that it is not able to take advantages of the characteristics of the wearable electronic efficiently.

SUMMARY

To address the above-discussed deficiencies, it is a primary object to provide at least the advantages described below. Accordingly, an aspect of the present disclosure is to provide a wearable electronic device capable of transmitting/receiving information in consideration of its state or a user's state, a main electronic device, a system, and a control method thereof.

Another aspect of the present disclosure is to provide a wearable electronic device capable of changing configuration setting values of a plurality of devices in conjunction therewith, a main electronic device, a system, and a control method thereof.

Another aspect of the present disclosure is to provide a wearable electronic device capable of transmitting and receiving information according to its characteristics, a main electronic device, a system, and a control method thereof.

In accordance with an aspect of the present disclosure, a wearable electronic device includes: an input module configured to receive a user manipulation for changing a configuration setting value of a main electronic device; and a communication module configured to transmit a control signal for changing a configuration setting value to the main electronic device.

In accordance with another aspect of the present disclosure, provided is a control method of a wearable electronic device. The method includes: receiving a user manipulation for changing a configuration setting value of a main electronic device; and transmitting a control signal for changing a configuration setting value to the main electronic device.

In accordance with another aspect of the present disclosure, a system includes: a wearable electronic device, when a user manipulation for changing a configuration setting value of a main electronic device is inputted, configured to transmit the changed configuration setting value to the main electronic device; and the main electronic device configured to change a configuration setting value according to the configuration setting value received from the wearable electronic device.

Before undertaking the DETAILED DESCRIPTION below, it can be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device can be implemented in hardware, firmware or software, or some combination of at least two of the same. It should be noted that the functionality associated with any particular controller can be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
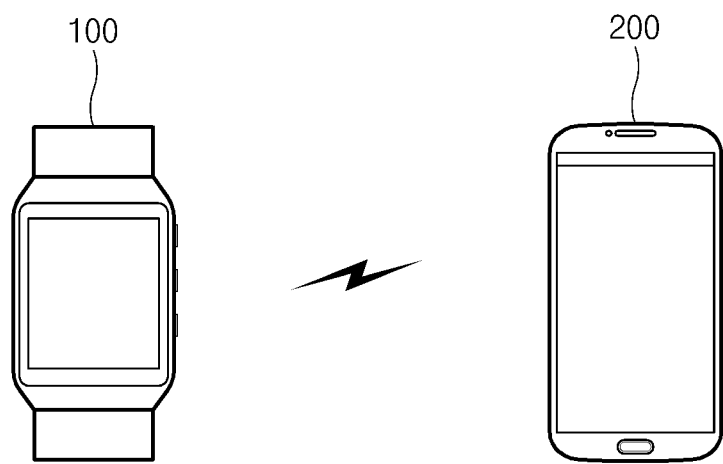
FIG. 1 is a view illustrating a configuration of a system according to various embodiments of the present disclosure.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure can be implemented in any suitably arranged wireless communications device or system. Hereinafter, various embodiments of the present disclosure are disclosed with reference to the accompanying drawings. Various modifications are possible in various embodiments of the present disclosure and specific embodiments are illustrated in drawings and related detailed descriptions are listed. However, this does not limit various embodiments of the present disclosure to a specific embodiment and it should be understood that the present disclosure covers all the modifications, equivalents, and/or replacements of this disclosure provided they come within the scope of the appended claims and their equivalents. With respect to the descriptions of the drawings, like reference numerals refer to like elements.

The term "include," "comprise," and "have", or "may include," or "may comprise" and "may have" used herein indicates disclosed functions, operations, or existence of elements but does not exclude other functions, operations or elements. Additionally, in various embodiments of the present disclosure, the term "include," "comprise," "including," or "comprising," specifies a property, a region, a fixed number, a step, a process, an element and/or a component but does not exclude other properties, regions, fixed numbers, steps, processes, elements and/or components.

In various embodiments of the present disclosure, expression "A or B" or "at least one of A or/and B" includes all possible combinations of items listed together. For instance, the expression "A or B", or "at least one of A or/and B" includes A, B, or both A and B.

The terms such as "1st", "2nd", "first", "second", and the like used herein may refer to modifying various different elements of various embodiments of the present disclosure, but do not limit the elements. For instance, such expressions do not limit the order and/or importance of corresponding components. The expressions can be used to distinguish one element from another element. For instance, both "a first user device" and "a second user device" indicate a user device but indicate different user devices from each other. For example, a first component can be referred to as a second component and vice versa without departing from the scope of the present disclosure.

In this disclosure below, when one part (or element, device, etc.) is referred to as being "connected" to another part (or element, device, etc.), it should be understood that the former can be "directly connected" to the latter, or "connected" to the latter via an intervening part (or element, device, etc.). In contrast, when an element is referred to as being "directly connected" or "directly coupled" to another element, there are no intervening elements present. According to the contexts disclosed in this specification, if a configuration is not limited explicitly, is illogical in a level of those skilled in the art, or is un-implemental, "connection" or an electrical configuration understood as "connection" includes direct or indirect connection and it is sufficient to be connected electrically and does not require a physical connection.

In various embodiments of the present disclosure, terms used in this specification are used to describe specific embodiments, and are not intended to limit the scope of the present disclosure. The terms of a singular form can include plural forms unless they have a clearly different meaning in the context.

Unless otherwise indicated herein, all the terms used herein, which include technical or scientific terms, can have the same meaning that is generally understood by a person skilled in the art. In general, the terms defined in the dictionary should be considered to have the same meaning as the contextual meaning of the related art, and, unless clearly defined herein, should not be understood abnormally or as having an excessively formal meaning.

FIG. 1 is a view illustrating a configuration of a system according to various embodiments of the present disclosure.

Referring to FIG. 1, a system includes a wearable electronic device 100 and a main electronic device 200. The wearable electronic device 100 refers to an electronic device wearable on a user's body (for example, smart watches and smart glasses).

The wearable electronic device 100 and the main electronic device 200 can be connected to each other via network. For example, the wearable electronic device 100 and the main electronic device 200 can be connected to each other via BLUETOOTH® (BT). According to an embodiment of the present disclosure, the main electronic device 200 can be connected at least one wearable electronic device 100 (for example, a plurality of wearable electronic devices) via network.

According to an embodiment of the present disclosure, a configuration setting value of the main electronic device 200 can be changed through the wearable electronic device 100. According to an embodiment of the present disclosure, the configuration setting value includes at least one of sound/vibration/mute mode setting, notification setting, wireless network setting, screen brightness setting, font size setting, or language setting. For example, the configuration setting value can include sound/vibration mode setting, sound type, sound volume, vibration pattern, whether to receive notification, notification reception condition, the type of notification information to be received, wireless fidelity (WiFi) setting, BLUETOOTH® setting, or global positioning system (GPS).

According to an embodiment of the present disclosure, the wearable electronic device 100 receives a user manipulation for changing a configuration setting value of the main electronic device 200. For example, the wearable electronic device 100 can receive a touch manipulation of a specified pattern on a touch screen. According to an embodiment of the present disclosure, the wearable electronic device 100 provides a user interface (UI) for changing a configuration setting value of the main electronic device 200. The wearable electronic device 100 receives a user manipulation through a UI that a display provides. According to an embodiment of the present disclosure, the wearable electronic device 100 provides a UI for each type of a configuration setting value. According to an embodiment of the present disclosure, the wearable electronic device 100 provides a UI for each electronic device connected via network.

According to an embodiment of the present disclosure, the wearable electronic device 100 displays on a display screen an object indicating that it is possible to change a configuration setting value of the main electronic device 200. For example, the wearable electronic device 100 displays a main electronic device icon for an item that can change a configuration setting value of the main electronic device 200 on a UI screen (for example, a menu screen) for changing a configuration setting value.

According to an embodiment of the present disclosure, when a user manipulation is inputted, the wearable electronic device 100 transmits to the main electronic device 200 a control signal for changing a configuration setting value of the main electronic device 200.

The main electronic device 200 changes a configuration setting value in response to a control signal received from the wearable electronic device 100. For example, the main electronic device 200 can change a configuration setting value from a sound mode to a vibration mode. In another example, even when a specified event occurs, the wearable electronic device 100 can change a configuration setting value not to transmit notification information. For another example, when a specified event occurs, the wearable electronic device 100 can change a configuration setting value to transmit only part of notification information.

Although it is described in the above embodiment that a configuration setting value of the main electronic device 200 is changed by a user manipulation inputted to the wearable electronic device 100, a configuration setting value of the wearable electronic device 100 can be changed by a user manipulation inputted to the main electronic device 200.

According to an embodiment of the present disclosure, the wearable electronic device 100 and the main electronic device 200 share a configuration setting value. For example, the wearable electronic device 100 can transmit a configuration setting value to the main electronic device 200 and vice versa. According to an embodiment of the present disclosure, when a configuration setting value is changed or at predetermined periods, the wearable electronic device 100 or the main electronic device 200 transmits the configuration setting value to the main electronic device 200 or the wearable electronic device 100.

According to an embodiment of the present disclosure, the wearable electronic device 100 and the main electronic device 200 each synchronize its configuration setting value. For example, when configuration setting values are different, the wearable electronic device 100 or the main electronic device 200 can synchronize its configuration setting value with the most recently changed configuration setting value. In another example, when the wearable electronic device 100 has a different configuration setting value from the main electronic device 200, it can synchronize its configuration setting value of the main electronic device 200.

According to an embodiment of the present disclosure, when the main electronic device 200 is connected to a new wearable electronic device via network, the main electronic device 200 shares a configuration setting value with the new wearable electronic device. According to an embodiment of the present disclosure, an electronic device newly connected to the network synchronizes its configuration setting value with a configuration setting value of an existing electronic device (for example, the main electronic device 200).

According to an embodiment of the present disclosure, when a specified event occurs, the main electronic device 200 transmits notification information on the event to the wearable electronic device 100. For example, when an SMS message is received, the main electronic device 200 can transmit notification information on the SMS message to the wearable electronic device 100.

According to an embodiment of the present disclosure, the wearable electronic device 100 transmits related information obtained by sensing a user's state to the main electronic device 200. For example, the wearable electronic device 100 can transmit information on whether a user sleeps obtained by sensing a user's sleep to the main electronic device 200. For another example, the wearable electronic device 100 can sense whether it is worn by a specified user or another user to transmit this information to the main electronic device 200.

According to an embodiment of the present disclosure, the wearable electronic device 100 determines a state of the wearable electronic device 100 to transmit this information to the main electronic device 200. For example, the wearable electronic device 100 can check whether it is worn, a battery state, whether it is in charging, and the current location to transmit this information to the main electronic device 200.

According to an embodiment of the present disclosure, the main electronic device 200 transmits notification information according to a state of the wearable electronic device 100 or a user state. For example, when a user is in a sleep state, even if a specified event occurs, notification information may not be transmitted to the wearable electronic device 100. For another example, when a specified user does not wear the wearable electronic device 100, notification information may not be transmitted. For another example, when the wearable electronic device 100 is in charging, even if a specified event occurs, notification information may not be transmitted to the wearable electronic device 100. For another example, when the current location of the wearable electronic device 100 or the main electronic device 200 corresponds to a specified location (for example, a meeting room), notification information may not be transmitted to the wearable electronic device 100.

According to an embodiment of the present disclosure, the wearable electronic device 100 displays only part of notification information received from the main electronic device 200. For example, when the wearable electronic device 100 (for example, a smart watch) receives notification information including text and images from the main electronic device 200, the wearable electronic device 100 can display only the text. When the wearable electronic device 100 (for example, a smart glasses) receives notification information including text and images from the main electronic device 200, the wearable electronic device 100 displays only the images.

According to an embodiment of the present disclosure, while displaying only part of notification information received from the main electronic device 200, the wearable electronic device 100 can display the entire notification information according to a user manipulation. For example, while only images are displayed on smart glasses, images and text can be displayed together according to a user manipulation.

According to an embodiment of the present disclosure, the main electronic device 200 transmits only part of notification information according to characteristics of the wearable electronic device 100. Once connected to the wearable electronic device 100 via network (for example, during a connection process), the main electronic device 200 is able to receive device characteristic information (for example, the type of a wearable electronic device and a display size) from the wearable electronic device 100. The main electronic device 200 can transmit only part of notification information according to the device characteristic information of the wearable electronic device 100. For example, when the wearable electronic device 100 is smart glasses, the main electronic device 200 can transmit only images of notification information including text and the images. For another example, when the wearable electronic device 100 is a smart watch, the main electronic device 200 can transmit only text of notification information including the text and images.

The wearable electronic device 100 displays part of notification information received from the main electronic device 200. According to an embodiment of the present disclosure, the wearable electronic device 100 requests entire notification information from the main electronic device 200 according to user manipulation. For example, when the entire notification information is requested, the main electronic device 200 can transmit the entire notification information to the wearable electronic device 100.

According to an embodiment of the present disclosure, when connected to a plurality of wearable electronic devices via network, the main electronic device 200 transmits (entire or part of) notification information according to a priority. For example, when connected to a smart watch (of the first priority) and a smart glasses (of the second priority), if a specified event occurs, the main electronic device 200 can transmit notification information to the smart watch (of the first priority). When notification confirmation information is not received from the smart watch for a specified time, the main electronic device 200 can transmit notification information to the smart glasses that is the second priority device.

Figure 2:
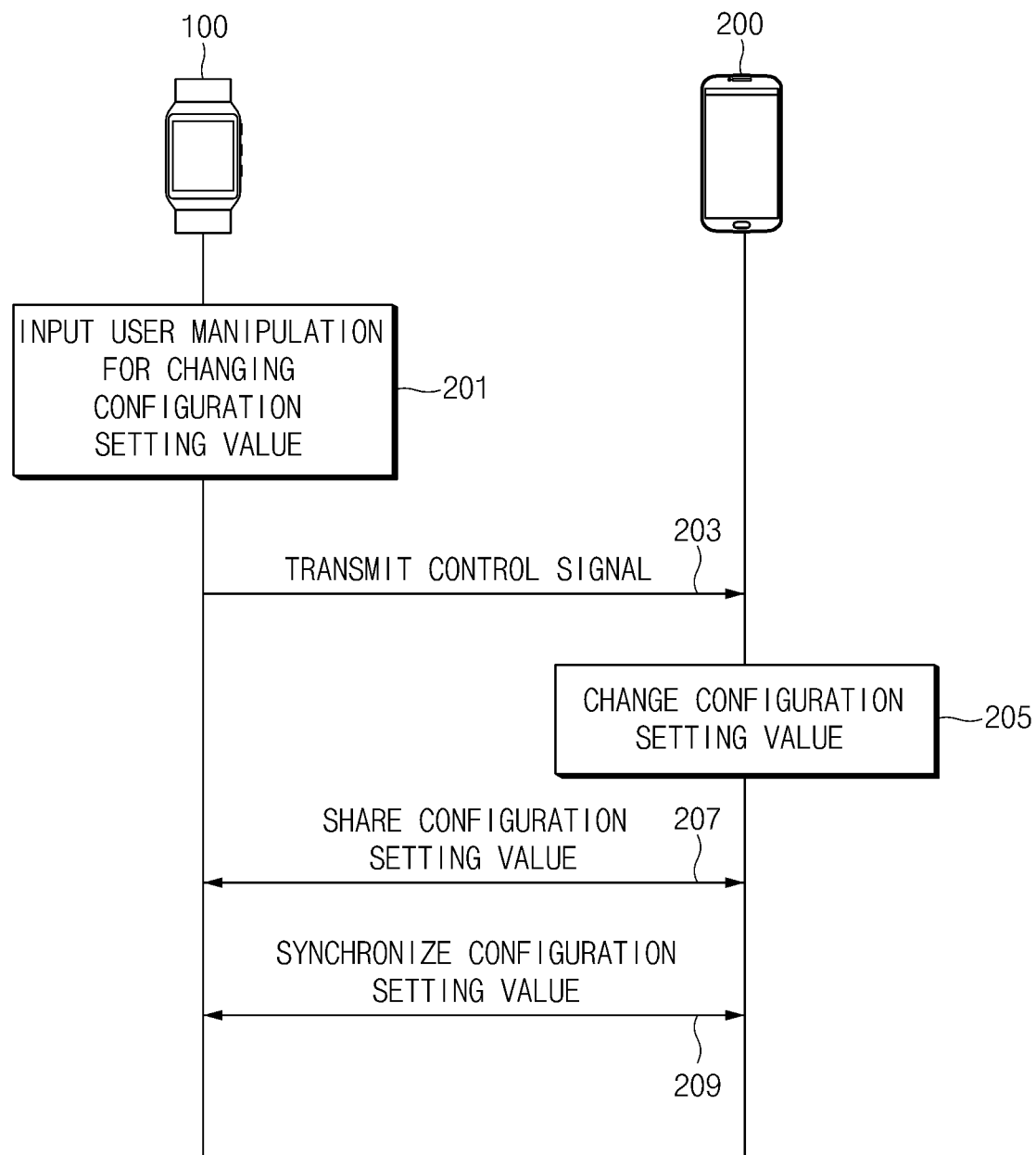
FIG. 2 is a view illustrating a control method of a system according to various embodiments of the present disclosure.

FIG. 2 is a view illustrating a control method of a system according to various embodiments of the present disclosure.

Referring to FIG. 2, a wearable electronic device 100 receives a user manipulation for changing a configuration setting value in operation 201. For example, the wearable electronic device 100 can receive a touch manipulation of a specified pattern on a touch screen. According to an embodiment of the present disclosure, the wearable electronic device 100 provides a UI for changing a configuration setting value of the main electronic device 200. According to an embodiment of the present disclosure, the wearable electronic device 100 can receive the configuration setting value of the main electronic device 200 from the main electronic device 200. According to an embodiment of the present disclosure, the UI can comprise current configuration setting value of the main electronic device 200 received from the main electronic device 200. The wearable electronic device 100 can receive a user manipulation through a UI that a display provides. According to an embodiment of the present disclosure, the wearable electronic device 100 provides a UI for each type of a configuration setting value. According to an embodiment of the present disclosure, the wearable electronic device 100 provides a UI for each electronic device connected via network.

According to an embodiment of the present disclosure, the wearable electronic device 100 displays on a display screen an object indicating that it is possible to change a configuration setting value of the main electronic device 200. For example, the wearable electronic device 100 can display a main electronic device icon for an item that can change a configuration setting value of the main electronic device 200 on a UI screen (for example, a menu screen) for changing a configuration setting value.

When a user manipulation is inputted, the wearable electronic device 100 transmits a control signal to the main electronic device 200 in operation 203.

The main electronic device 200 changes a configuration setting value in response to a control signal received from the wearable electronic device 100 in operation 205.

The wearable electronic device 100 and the main electronic device 200 share a configuration setting value in operation 207. For example, the wearable electronic device 100 can transmit a configuration setting value to the main electronic device 200 and vice versa. According to an embodiment of the present disclosure, when a configuration setting value is changed or at predetermined periods, the wearable electronic device 100 or the main electronic device 200 transmits the configuration setting value to the main electronic device 200 or the wearable electronic device 100.

According to an embodiment of the present disclosure, the wearable electronic device 100 and the main electronic device 200 each synchronize a configuration setting value on the basis of the shared configuration setting value in operation 209. For example, if configuration setting values are different, the wearable electronic device 100 or the main electronic device 200 can synchronize its configuration setting value with the most recently changed configuration setting value. For another example, if the wearable electronic device 100 has a different configuration setting value from the main electronic device 200, the wearable electronic device 100 synchronizes its configuration setting value with a configuration setting value of the main electronic device 200.

According to an embodiment of the present disclosure, when the main electronic device 200 is connected to a new wearable electronic device via network, the wearable electronic device 100 shares a configuration setting value with the new wearable electronic device. According to an embodiment of the present disclosure, an electronic device newly connected to the network synchronizes its configuration setting value with a configuration setting value of an existing electronic device (for example, the main electronic device 200).

Figure 3:
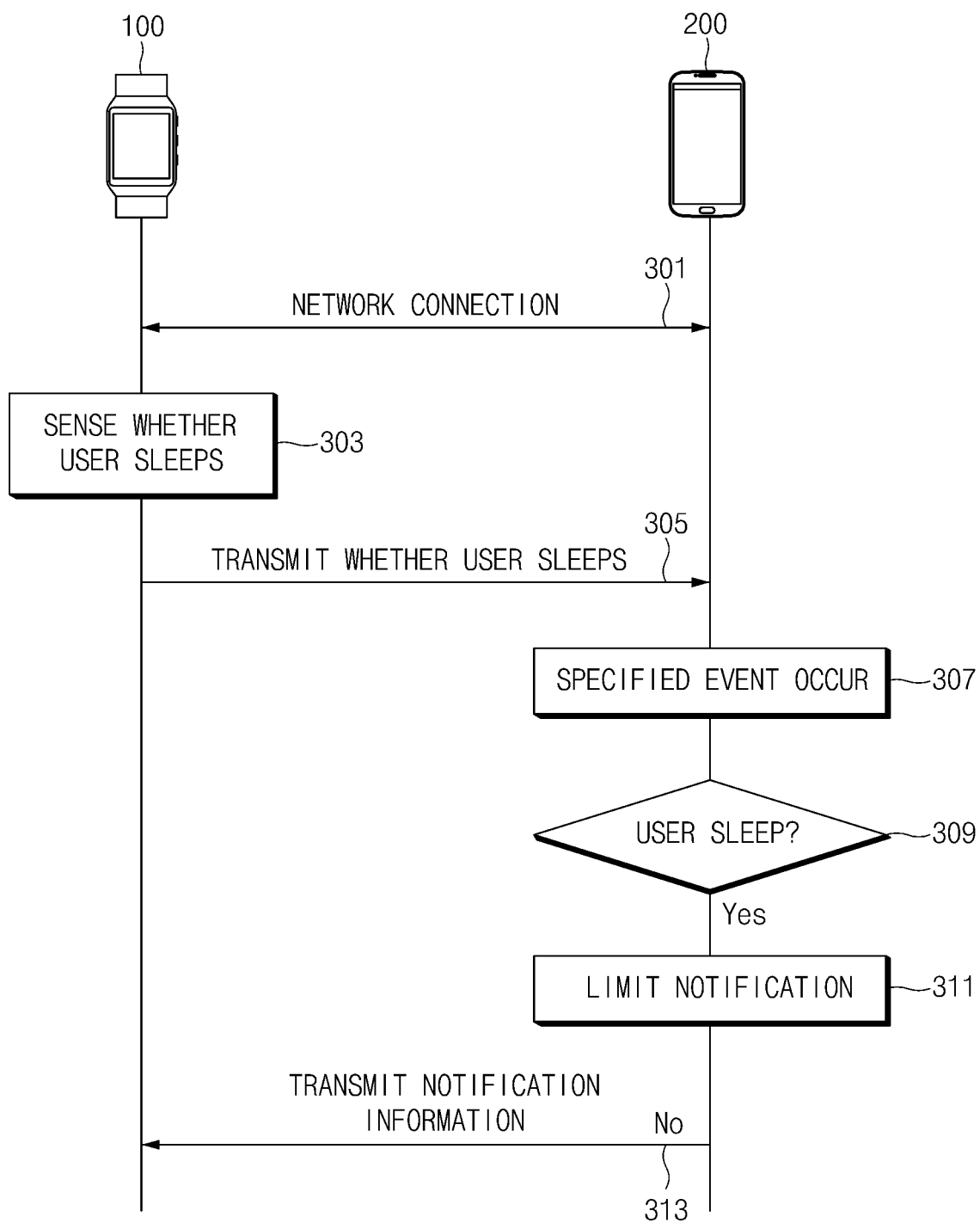
FIG. 3 is a view illustrating a control method of a system according to various embodiments of the present disclosure.

FIG. 3 is a view illustrating a control method of a system according to various embodiments of the present disclosure.

Referring to FIG. 3, the wearable electronic device 100 and the main electronic device 200 are connected to each other via network in operation 301. For example, the wearable electronic device 100 and the main electronic device 200 can be connected to each other via BLUE TOOTH®.

According to an embodiment of the present disclosure, the wearable electronic device 100 senses whether a user sleeps in operation 303. For example, the wearable electronic device 100 can sense whether a user sleeps by using a gyro sensor and a heart rate sensor. According to an embodiment of the present disclosure, the wearable electronic device 100 transmits a user's sleep state to the main electronic device 200 in operation 305.

According to an embodiment of the present disclosure, when a specified event (for example, SMS message reception) occurs in operation 307, the main electronic device 200 determines whether a user sleeps in operation 309. When it is determined that the user sleeps in operation 309 (Yes), the main electronic device 200 limits a notification in operation 311. For example, the main electronic device 200 may not transmit notification information to the wearable electronic device 100. When it is determined that the user does not sleep in operation 309 (No), the main electronic device 200 transmits notification information on the occurred event in operation 313.

Although notification information is transmitted according to whether a user sleeps in the embodiment described with reference to FIG. 3, the notification information can be transmitted on the basis of whether the wearable electronic device 100 is worn, whether a specified user wears it, a battery state, whether it is in charging, and the current location.

Figure 4:
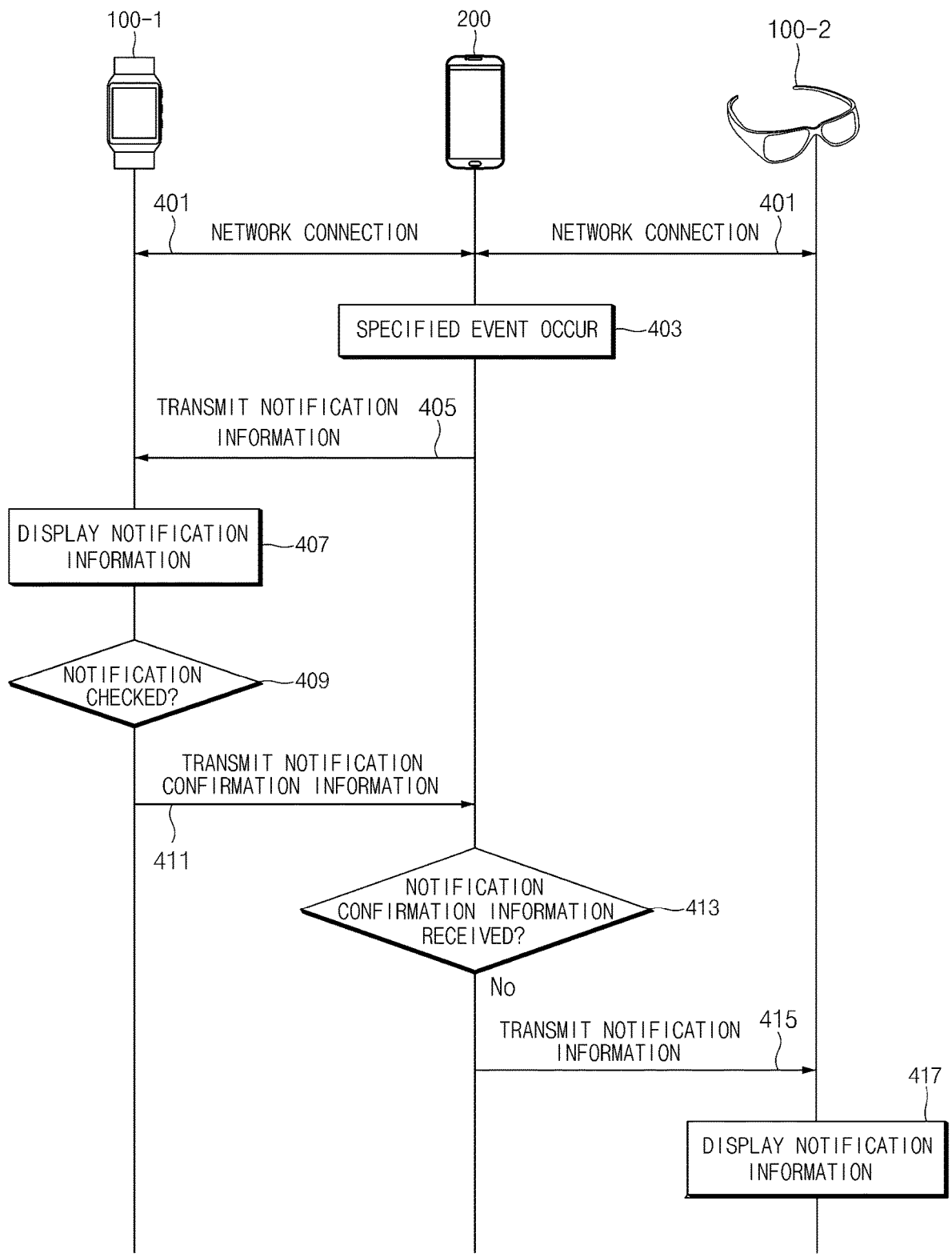
FIG. 4 is a view illustrating a control method of a system according to various embodiments of the present disclosure.

FIG. 4 is a view illustrating a control method of a system according to various embodiments of the present disclosure.

Referring to FIG. 4, a main electronic device 200 is connected to a plurality of wearable electronic devices 100-1 and 100-2 via network in operation 401. The main electronic device 200 sets a priority on the plurality of wearable electronic devices 100-1 and 100-2 connected via network. According to an embodiment of the present disclosure, the main electronic device 200 sets a priority according to a user manipulation or characteristics of a wearable electronic device. When a specified event (for example, SMS message reception) occurs, the main electronic device 200 transmits notification information according to a priority. For example, the first wearable electronic device 100-1 can be set to the first priority and the second wearable electronic device 100-2 can be set to the second priority. When a specified event occurs in operation 403, the main electronic device 200 transmits notification information to the first wearable electronic device 100-1 of the first priority in operation 405.

When receiving the notification information from the main electronic device 200, the first wearable electronic device 100-1 displays the received notification information on a display screen in operation 407. According to an embodiment of the present disclosure, the first wearable electronic device 100-1 displays only part of notification information received from the main electronic device 200. For example, when notification information including text and images is received from the main electronic device 200, only the images can be displayed.

According to an embodiment of the present disclosure, while displaying only part of notification information received from the main electronic device 200, the first wearable electronic device 100-1 displays the entire notification information according to a user manipulation. For example, while only images are displayed on smart glasses, images and text can be displayed together according to a user manipulation.

The first wearable electronic device 100-1 determines whether a user checks the notification information in operation 409. When the user checks the notification information in operation 409 (Yes), the first wearable electronic device 100-1 transmits notification confirmation information to the main electronic device 200 in operation 411.

When a specified time elapses after transmitting the notification information, the main electronic device 200 determines whether the notification confirmation information is received in operation 413. When the notification confirmation information is not received in operation 413 (No), the main electronic device 200 transmits the notification information to the second wearable electronic device 100-2 of the second priority in operation 415.

When receiving the notification information from the main electronic device 200, the second wearable electronic device 100-2 displays the received notification information in operation 417.

Figure 5:
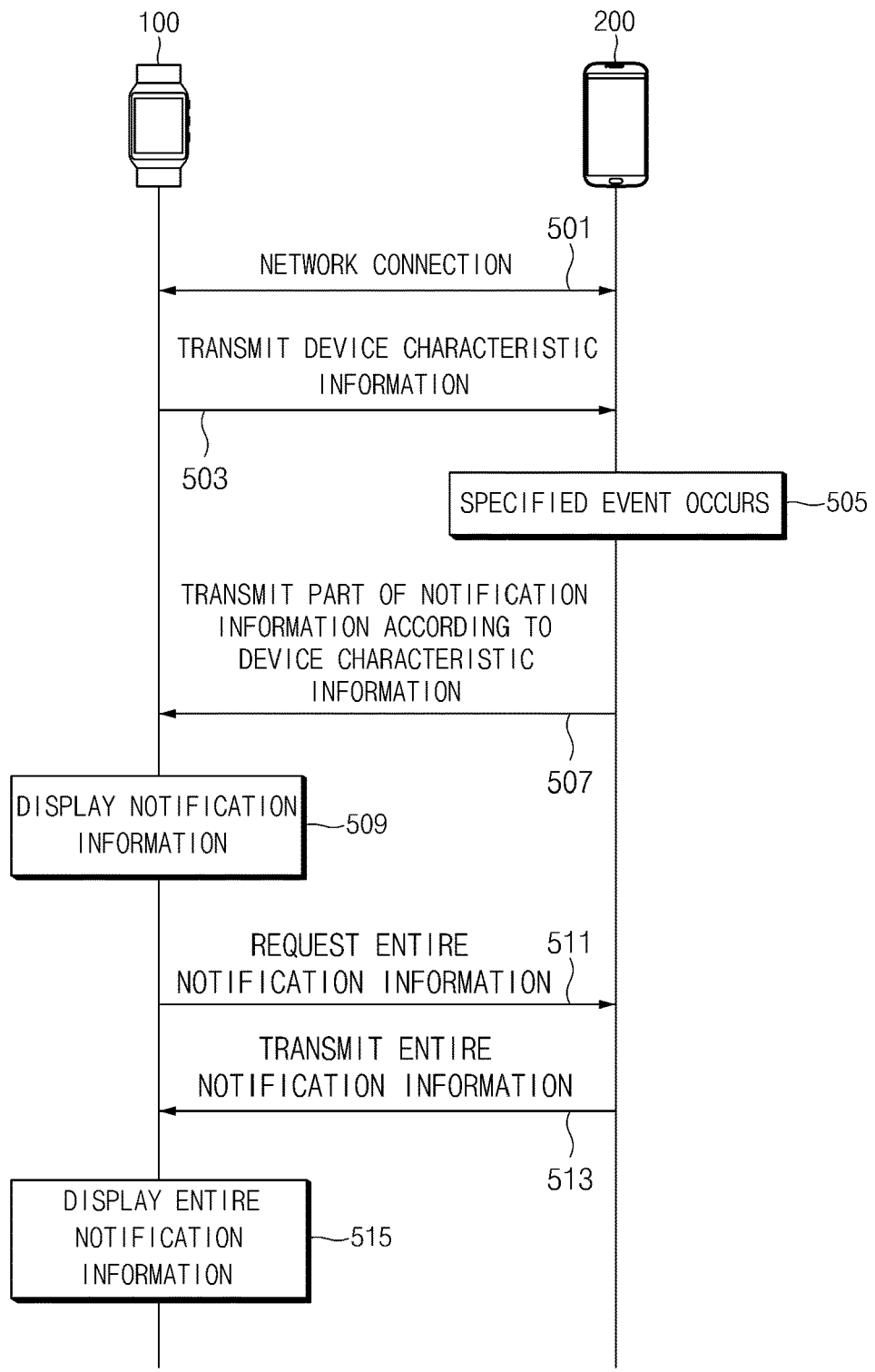
FIG. 5 is a view illustrating a control method of a system according to various embodiments of the present disclosure.

FIG. 5 is a view illustrating a control method of a system according to various embodiments of the present disclosure.

Referring to FIG. 5, a main electronic device 200 is connected to a wearable electronic device 100 via network in operation 501.

Once connected to the wearable electronic device 100 via network (for example, during a connection process), the wearable electronic device 100 transmits device characteristic information (for example, the type of a wearable electronic device and a display size) to the main electronic device 200.

When a specified event occurs in operation 505, the main electronic device 200 transmits part of notification information to the wearable electronic device 100 according to the device characteristic information in operation 507. For example, when the wearable electronic device 100 is a smart watch, the main electronic device 200 transmits only text of notification information including the text and images. For another example, when the wearable electronic device 100 is smart glasses, the main electronic device 200 transmits only images of notification information including text and the images.

The wearable electronic device 100 displays the notification information received from the main electronic device 200 on a display screen in operation 509. According to an embodiment of the present disclosure, the wearable electronic device 100 requests entire notification information from the main electronic device 200 according to user manipulation in operation 511. When the entire notification information is requested, the main electronic device 200 transmits the entire notification information to the wearable electronic device 100 in operation 513. The wearable electronic device 100 displays on a display screen the entire notification information received from the main electronic device 200.

Figure 6:
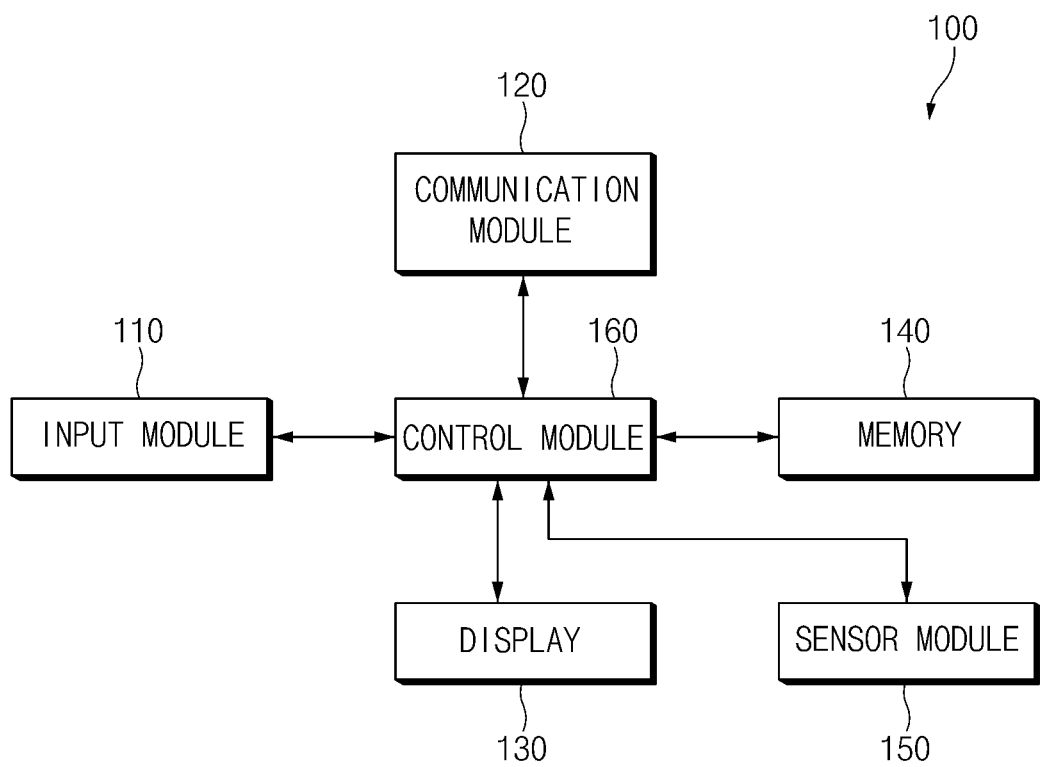
FIG. 6 is a block diagram illustrating a configuration of a wearable electronic device according to various embodiments of the present disclosure.

FIG. 6 is a block diagram illustrating a configuration of a wearable electronic device according to various embodiments of the present disclosure.

Referring to FIG. 6, a wearable electronic device 100 includes an input module 110, a communication module 120, a display 130, a memory 140, a sensor module 150, and a control module 160.

The input module 110 receives a user manipulation. The input module 110 can be implemented with at least one of a touch screen or touch pad operating by a user's touch input, a key pad or keyboard including various function keys, numeric keys, special keys, and character keys, a motion recognition sensor for recognizing a user's motion, and a voice recognition sensor for recognizing a user's voice.

According to an embodiment of the present disclosure, the input module 110 receives a user manipulation for changing a configuration setting value of the main electronic device 200. For example, the wearable electronic device 100 can receive a touch manipulation of a specified pattern on a touch screen. For example, referring to FIG. 7, the input module 110 can receive a touch manipulation in a diagonal direction 704 of the touch screen. According to an embodiment of the present disclosure, the input module 110 can receive a user manipulation through a UI that the display 130 provides.

According to an embodiment of the present disclosure, when only part of notification information received from the main electronic device 200 is displayed on the display 130, the input module 110 can receive a user manipulation for displaying entire notification information.

According to an embodiment of the present disclosure, when only part of notification information is received, the input module 110 can receive a user manipulation for requesting entire notification information from the main electronic device 200.

Figure 7:
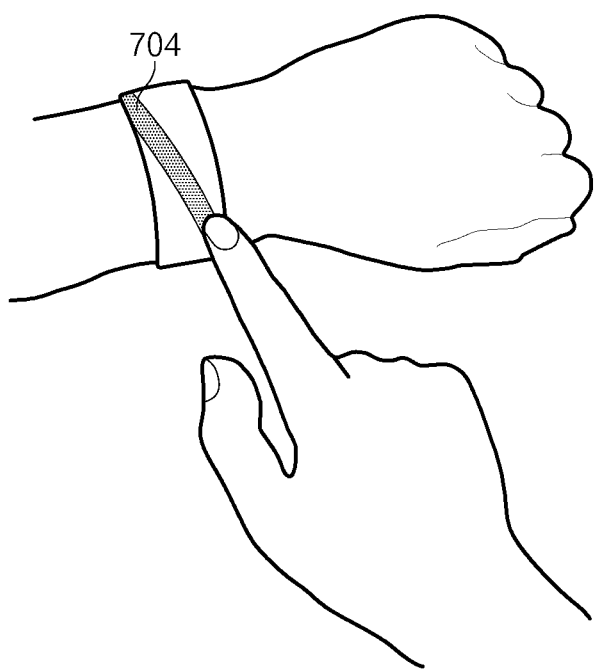
FIG. 7 is a view illustrating a user manipulation according to various embodiments of the present disclosure.

The communication module 120 transmits and receives various information or controls signals as connected to the main electronic device 200 via network. According to an embodiment of the present disclosure, the communication module 120 can transmit to the main electronic device 200 a control signal for changing a configuration setting value of the main electronic device 200 according to a user manipulation inputted to the input module 110. For example, when a user manipulation shown in FIG. 7 is inputted, the communication module 120 can transmit a signal for performing a control to enter an interference prohibition mode (for example, a mode that the main electronic device 200 does not transmit notification information) to the main electronic device 200.

According to an embodiment of the present disclosure, the communication module 120 transmits a configuration setting value to the main electronic device 200 and receives a configuration setting value from the main electronic device 200 in order to share the configuration setting value with the main electronic device 200. According to an embodiment of the present disclosure, when a configuration setting value is changed or at predetermined periods, the communication module 120 transmits a configuration setting value to the main electronic device 200 or the wearable electronic device 100.

According to an embodiment of the present disclosure, the communication module 120 transmits a user's state to the main electronic device 200. For example, the communication module 120 can transmit whether a user sleeps to the main electronic device 200. For another example, the communication module 120 can transmit whether a specified user wears the wearable electronic device 100 to the main electronic device 200. According to an embodiment of the present disclosure, the communication module 120 transmits a state of the wearable electronic device 100 (for example, whether it is worn, a battery state, whether it is in charging, and the current location) to the main electronic device 200.

According to an embodiment of the present disclosure, the communication module 120 receives notification information on an event occurring from the main electronic device 200. For example, when the main electronic device 200 receives an SMS message, the communication module 120 receives the SMS message from the main electronic device 200.

According to an embodiment of the present disclosure, when only part of notification information is received from the main electronic device 200, the communication module 120 receives entire notification information by requesting the entire notification information from the main electronic device 200 according to a user manipulation.

According to an embodiment of the present disclosure, when a user checks notification information displayed on the display 130, the communication module 120 transmits notification confirmation information to the main electronic device 200.

The display 130 can display (or, provide) UI or object according to controlling of the control module 160. According to an embodiment of the present disclosure, the display 130 provides a UI for changing a configuration setting value of the main electronic device 200. According to an embodiment of the present disclosure, the input module 110 receives a user manipulation through a UI that the display 130 provides. According to an embodiment of the present disclosure, the display 130 provides a UI for each type of a configuration setting value. According to an embodiment of the present disclosure, the display 130 provides a UI for each electronic device connected via network.

According to an embodiment of the present disclosure, the display 130 displays on a display screen an object indicating that it is possible to change a configuration setting value of the main electronic device 200. For example, the display 130 can display a main electronic device icon for an item that can change a configuration setting value of the main electronic device 200 on a UI screen (for example, a menu screen) for changing a configuration setting value.

The display 130 displays notification information received from the main electron is device 200. According to an embodiment of the present disclosure, the display 130 displays only part of notification information received from the main electronic device 200. For example, when notification information including text and images is received from the main electronic device 200, the display 130 can display only the text. According to an embodiment of the present disclosure, the display 130 displays entire notification information according to a user manipulation.

According to an embodiment of the present disclosure, when the wearable electronic device 100 is in an interference prohibition mode, the display 130 displays information displayed on a display screen with gray color. Accordingly, a user can intuitively know whether the wearable electronic device 100 is in an interference prohibition mode.

The memory 140 stores a configuration setting value of the wearable electronic device 100. According to an embodiment of the present disclosure, the memory 140 stores a configuration setting value of the main electronic device 200, which is received from the main electronic device 200.

The sensor module 150 includes various sensors. For example, the sensor module 150 can include a gyro sensor, an acceleration sensor, a grip sensor, a proximity sensor, an illumination sensor, and a heart rate sensor. The sensor module 150 can operates according to a control of the control module 160 to obtain various sensing values.

The control module 160 controls overall operations of the wearable electronic device 100. According to an embodiment of the present disclosure, the control module 160 determines a state of a user or the wearable electronic device 100. For example, the control module 160 can determine whether a user sleeps by using a sensing value measured by a heart rate sensor, a biometric sensor, or a gyro sensor. For another example, the control module 160 can determine whether a specified user or another user wears the wearable electronic device 100 by using a sensing value measured by a heart rate sensor and a biometric sensor. In addition to this, the control module 160 can determine whether the wearable electronic device 100 is worn, a battery state, and whether it is in charging.

According to an embodiment of the present disclosure, the control module 160 synchronizes a configuration setting value with that of the main electronic device 200. For example, if a configuration setting value of the wearable electronic device 100 and a configuration setting value of the main electronic device 200 are different from each other, the control module 160 can synchronize the configuration setting value of the wearable electronic device 100 with the most recently changed configuration setting value. For another example, if a configuration setting value of the wearable electronic device 100 and a configuration setting value of the main electronic device 200 are different from each other, the control module 160 can synchronize the configuration setting value of the wearable electronic device 100 with the configuration setting value of the main electronic device 200.

FIG. 8 is a view illustrating a UI displayed on a wearable electronic device according to various embodiments of the present disclosure.

Figure 8A:
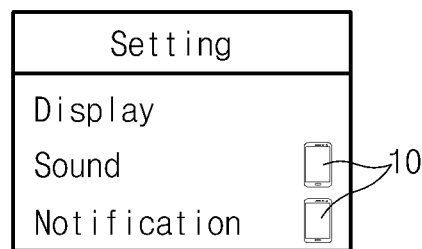
FIGS. 8A to 8C are views illustrating a UI displayed on a wearable electronic device according to various embodiments of the present disclosure.
Figure 8B:
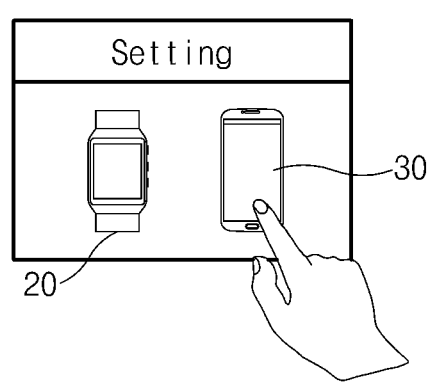

According to an embodiment of the present disclosure, the display 130 displays an object (or an UI) indicating that it is possible to change a configuration setting value of the main electronic device 200. For example, as shown in FIG. 8A, the display 130 can display on a menu screen for configuration setting an object 10 indicating that it is possible to change a configuration setting value of the main electronic device 200. For example, referring to FIG. 8A, an icon object in the form of the main electronic device 200 can be displayed.

Figure 8C:
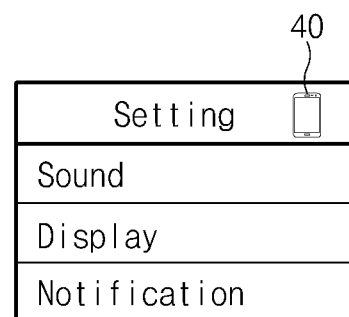

According to an embodiment of the present disclosure, the display 130 provides an UI for changing a configuration setting value of the main electronic device 200. For example, referring to FIG. 8B, icons 20 and 30 indicating a wearable electronic device and a main electronic device can be displayed on a menu screen for configuration setting. When the wearable electronic device icon 20 is selected from the menu screen shown in FIG. 8B, a menu screen for changing a configuration setting value of the wearable electronic device 20 can be provided. When the main electronic device icon 30 is selected, a menu screen for changing a configuration setting value of the main electronic device 200 shown in FIG. 8C can be provided. Referring to FIG. 8C, the display 130 displays an icon 40 indicating a menu for changing a configuration setting value of the main electronic device 200.

Figure 9:
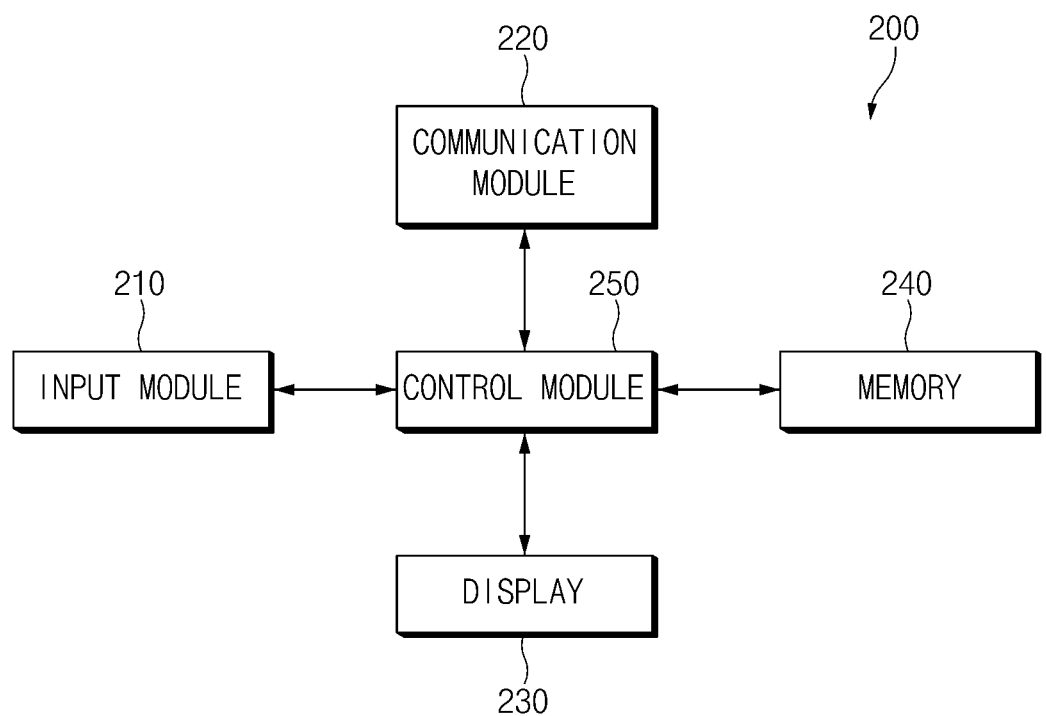
FIG. 9 is a view illustrating a configuration of a main electronic device according to an embodiment of the present disclosure.

FIG. 9 is a view illustrating a configuration of a main electronic device according to an embodiment of the present disclosure.

Referring to FIG. 9, a main electronic device 200 includes an input module 210, a communication module 220, a display 230, a memory 240, and a control module 250.

The input module 210 receives a user manipulation. The input module 210 can be implemented with at least one of a touch screen or touch pad operating by a user's touch input, a key pad or keyboard including various function keys, numeric keys, special keys, and character keys, a motion recognition sensor for recognizing a user's motion, and a voice recognition sensor for recognizing a user's voice.

According to an embodiment of the present disclosure, the input module 210 receives a user manipulation for changing a configuration setting value of the wearable electronic device 100. According to an embodiment of the present disclosure, the input module 210 receives a user manipulation through a UI provided by the display 230.

The communication module 220 transmits and receives various information or controls signals as connected to the wearable electronic device 100 via network. According to an embodiment of the present disclosure, the communication module 220 transmits to wearable electronic device 100 a control signal for changing a configuration setting value of the wearable electronic device 100 according to a user manipulation inputted to the input module 210.

According to an embodiment of the present disclosure, the communication module 220 receives a control signal for changing a configuration setting value from the wearable electronic device 100.

According to an embodiment of the present disclosure, the communication module 220 transmits a configuration setting value to the wearable electronic device 100 and receives a configuration setting value from the wearable electronic device 100 in order to share the configuration setting value with the wearable electronic device 100. According to an embodiment of the present disclosure, when a configuration setting value is changed or at predetermined periods, the communication module 120 transmits a configuration setting value to the main electronic device 200 or the wearable electronic device 100.

According to an embodiment of the present disclosure, the communication module 220 receives a user's state from the wearable electronic device 100. For example, the communication module 220 can receive whether a user sleeps from the wearable electronic device 100. For another example, the communication module 220 can receive whether a specified user wears the wearable electronic device 100 from the wearable electronic device 100. According to an embodiment of the present disclosure, the communication module 220 receives a state of the wearable electronic device 100 (for example, whether it is worn, a battery state, whether it is in charging, and the current location) from the wearable electronic device 100.

According to an embodiment of the present disclosure, when a specified event occurs, the communication module 220 transmits notification information on the event to the wearable electronic device 100. For example, when an SMS message is received, the communication module 220 can transmit notification information on the SMS message to the wearable electronic device 100.

According to an embodiment of the present disclosure, once connected to the wearable electronic device 100 via network (for example, during a connection process), the communication module 220 can receive device characteristic information (for example, the type of a wearable electronic device and a display size) from the wearable electronic device 100.

The display 230 provides a UI for changing a configuration setting value of the wearable electronic device 100. According to an embodiment of the present disclosure, the input module 210 receives a user manipulation through a UI that the display 230 provides. According to an embodiment of the present disclosure, the display 230 provides a UI for each type of a configuration setting value. According to an embodiment of the present disclosure, the display 230 provides a UI for each electronic device connected via network.

According to an embodiment of the present disclosure, the display 230 displays on a display screen an object indicating that it is possible to change a configuration setting value of the main electronic device 200. For example, the display 230 can display a main electronic device icon for an item that changes a configuration setting value of the main electronic device 200 on a UI screen (for example, a menu screen) for changing a configuration setting value.

The memory 240 stores a configuration setting value of the main electronic device 200. According to an embodiment of the present disclosure, the memory 240 stores a configuration setting value of the wearable electronic device 100, which is received from the wearable electronic device 100. According to an embodiment of the present disclosure, the memory 240 stores a user's state or a state of the wearable electronic device 100, which is received from the wearable electronic device 100. According to an embodiment of the present disclosure, the memory 240 stores device characteristic information received from the wearable electronic device 100.

The control module 250 controls overall operations of the main electronic device 200. According to an embodiment of the present disclosure, the control module 250 changes a configuration setting value according to a control signal received from the wearable electronic device 100.

According to an embodiment of the present disclosure, the control module 250 synchronizes a configuration setting value with that of the wearable electronic device 100. For example, if a configuration setting value of the wearable electronic device 100 and a configuration setting value of the main electronic device 200 are different from each other, the control module 250 can synchronize the configuration setting value of the main electronic device 200 with the most recently changed configuration setting value.

According to an embodiment of the present disclosure, the control module 250 performs a control to transmit notification information according to a state of the wearable electronic device 100 or a user state. For example, when a user is in a sleep state, even if a specified event occurs, the control module 250 may not transmit notification information to the wearable electronic device 100. For another example, when a specified user does not wear the wearable electronic device 100, the control module 250 can perform a control not to transmit notification information. For another example, when the wearable electronic device 100 is in charging, even if a specified event occurs, the control module 250 can perform a control not to transmit notification information to the wearable electronic device 100. For another example, when the current location of the wearable electronic device 100 corresponds to a specified location (for example, a meeting room), the control module 220 can perform a control not to transmit notification information.

According to an embodiment of the present disclosure, the control module 250 performs a control to transmit only part of notification information according to the device characteristic information of the wearable electronic device 100. For example, when the wearable electronic device 100 is smart glasses, the control module 250 can transmit only images of notification information including text and the images. For another example, when the wearable electronic device 100 is a smart watch, the control module 250 can transmit only text of notification information including the text and images.

According to an embodiment of the present disclosure, when connected to a plurality of wearable electronic devices via network, the control module 250 performs a control to transmit (entire or part of) notification information according to a priority. For example, when connected to a smart watch (of the first priority) and a smart glasses (of the second priority), if a specified event occurs, the control module 250 can transmit notification information to the smart watch (of the first priority). When notification confirmation information is not received from the smart watch for a specified time, the control module 250 can perform a control to transmit notification information to the smart glasses that is the second priority device.

Figure 10C:
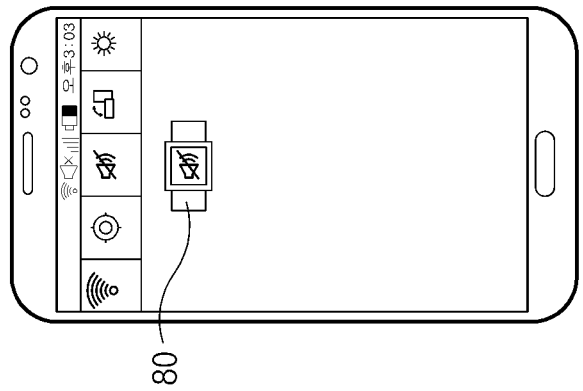
FIGS. 10A to 10C are views illustrating a UI displayed on a main electronic device according to various embodiments of the present disclosure.

FIG. 10 is a view illustrating a UI displayed on a main electronic device according to various embodiments of the present disclosure.

Figure 10B:
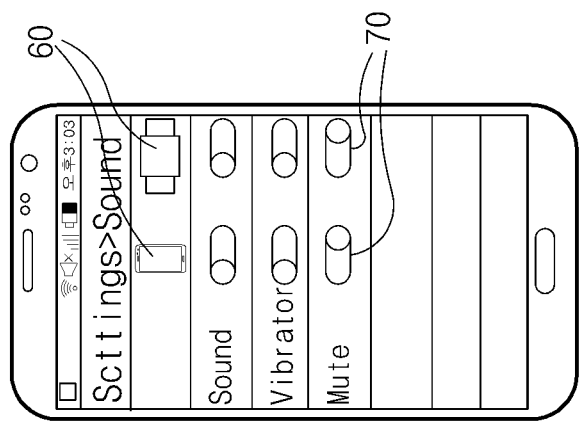
Figure 10A:
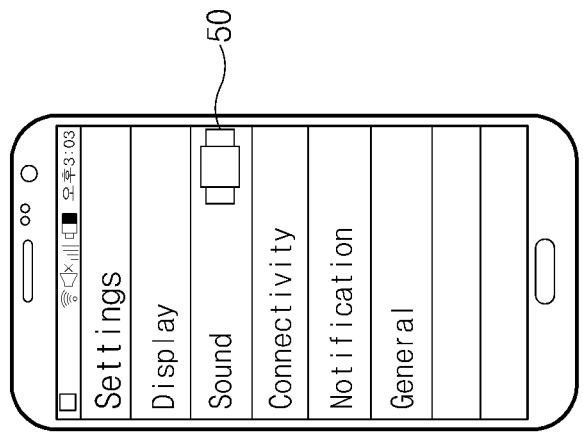

According to an embodiment of the present disclosure, the display 230 displays an object (or an UI) indicating that it is possible to change a configuration setting value of the wearable electronic device 100. For example, as shown in FIG. 10A, the display 230 can display on a menu screen for configuration setting an object 50 indicating that it is possible to change a configuration setting value of the wearable electronic device 100. For example, referring to FIG. 10A, an icon object 50 in the form of the wearable electronic device 100 can be displayed. The form of the object 50 can be determined on the basis of device characteristics information received from the wearable electronic device 100.

According to an embodiment of the present disclosure, the display 230 provides an UI for changing a configuration setting value of the wearable electronic device 100. For example, referring to FIG. 10B, the display 230 can provide an UI for changing a configuration setting value of each of the wearable electronic device 100 and the main electronic device 200 on a menu screen for configuration setting. Referring to FIG. 10B, when the wearable electronic device icon 20 is selected from the menu screen shown in FIG. 8B, a menu screen for changing a configuration setting value of the wearable electronic device 100 is provided. According to an embodiment of the present disclosure, an object 60 for distinguishing the wearable electronic device 100 from the main electronic device 200 is displayed on a menu screen. According to an embodiment of the present disclosure, an UI 70 for changing a configuration setting value of each of the wearable electronic device 100 and the main electronic device 200 are provided. According to an embodiment of the present disclosure, an UI for changing a configuration setting value of the wearable electronic device 100 is provided from a menu screen for changing a configuration setting value of the main electronic device 200. For example, referring to FIG. 8C, an UI 80 for changing a sound setting of the wearable electronic device 100 can be provided from a menu screen for changing a configuration setting value of the main electronic device 200.

Figure 11:
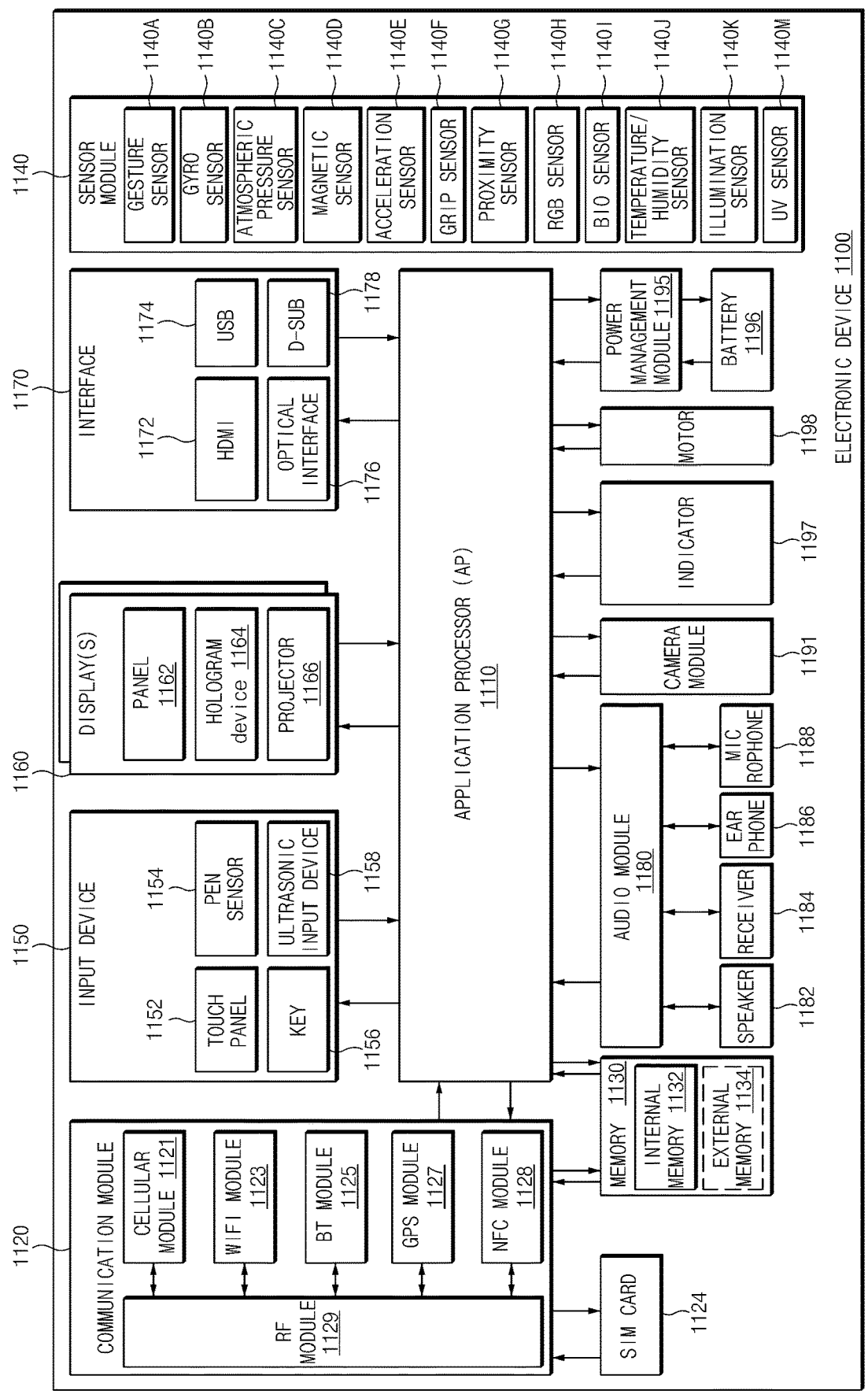
FIG. 11 is a block diagram of an electronic device 1100 according to various embodiments of the present disclosure.

FIG. 11 is a block diagram of an electronic device 1100 according to various embodiments of the present disclosure. The electronic device 1100, for example, can configure all or part of the wearable electronic device 100 shown in FIG. 6 or the main electronic device 200 shown in FIG. 9. Referring to FIG. 11, the electronic device 1100 includes application processor (AP) 1110, a communication module 1120, a subscriber identification module (SIM) card 1124, a memory 1130, a sensor module 1140, an input device 1150, a display 1160, an interface 1170, an audio module 1180, a camera module 1191, a power management module 1195, a battery 1196, an indicator 1197, and a motor 1198.

The AP 1110 (for example, the control unit 130) controls a plurality of hardware or software components connected to the AP 1110 and also performs various data processing and operations with multimedia data by executing an operating system or an application program. The AP 1110 can be implemented with a system on chip (SoC), for example. According to an embodiment of the present disclosure, the AP 1110 further includes a graphic processing unit (GPU) (not shown).

The communication module 1120 performs data transmission and reception between the electronic device 1100 (for example, the electronic device 100) and other electronic devices connected via network. According to an embodiment of the present disclosure, the communication module 1120 includes a cellular module 1121, a WiFi module 1123, a BT module 1125, a GPS module 1127, an NFC module 1128, and a radio frequency (RF) module 1129.

The cellular module 1121 provides voice calls, video calls, text services, or internet services through a communication network (for example, LTE, LTE-A, CDMA, WCDMA, UMTS, WiBro, or GSM). Additionally, the cellular module 1121 performs a distinction and authentication operation on an electronic device in a communication network by using a subscriber identification module (for example, the SIM card 1124), for example. According to an embodiment of the present disclosure, the cellular module 1121 performs at least part of a function that the AP 1110 provides. For example, the cellular module 1121 can perform at least part of a multimedia control function.

According to an embodiment of the present disclosure, the cellular module 1121 further includes a communication processor (CP). Additionally, the cellular module 1121 can be implemented with SoC, for example. As shown in FIG. 11, components such as the cellular module 1121 (for example, a CP), the memory 1130, or the power management module 1195 are separated from the AP 1110, but according to an embodiment of the present disclosure, the AP 1110 can be implemented including some of the above-mentioned components (for example, the cellular module 1121).

According to an embodiment of the present disclosure, the AP 1110 or the cellular module 1121 (for example, a CP) loads instructions or data, which are received from a nonvolatile memory or at least one of other components connected thereto, into a volatile memory and then can process them. Furthermore, the AP 1110 or the cellular module 1121 stores data received from or generated by at least one of other components in a nonvolatile memory.

Each of the WiFi module 1123, the BT module 1125, the GPS module 1127, and the NFC module 1128 includes a processor for processing data transmitted and received through a corresponding module. Although the cellular module 1121, the WiFi module 1123, the BT module 1125, the GPS module 1127, and the NFC module 1128 are shown as separate blocks in FIG. 11, according to an embodiment of the present disclosure, some (for example, at least two) of the cellular module 1121, the WiFi module 1123, the BT module 1125, the GPS module 1127, and the NFC module 1128 can be included in one integrated chip (IC) or an IC package. For example, at least some (for example, a CP corresponding to the cellular module 1121 and a WiFi processor corresponding to the WiFi module 1123) of processors respectively corresponding to the cellular module 1121, the WiFi module 1123, the BT module 1125, the GPS module 1127, and the NFC module 1128 can be implemented with one SoC.

The RF module 1129 is responsible for data transmission and reception, for example, the transmission/reception of an RF signal. Although not shown in the drawings, the RF module 1129 includes a transceiver, a power amp module (PAM), a frequency filter, or a low noise amplifier (LNA). Additionally, the RF module 1129 further includes components for transmitting/receiving electromagnetic waves on a free space in a wireless communication, for example, conductors or conducting wires. Although the cellular module 1121, the WiFi module 1123, the BT module 1125, the GPS module 1127, and the NFC module 1128 share one RF module 1129 shown in FIG. 11, according to an embodiment of the present disclosure, at least one of the cellular module 1121, the WiFi module 1123, the BT module 1125, the GPS module 1127, and the NFC module 1128 can perform the transmission/reception of an RF signal through an additional RF module.

The SIM card 1124 can be a card including a subscriber identification module and can be inserted into a slot formed at a specific position of an electronic device. The SIM card 1124 can include unique identification information (for example, an integrated circuit card identifier (ICCID)) or subscriber information (for example, an international mobile subscriber identity (IMSI)).

The memory 1130 (for example, the memory 140 or 240) can include an internal memory 1132 or an external memory 1134. The internal memory 1132 can include at least one of a volatile memory (for example, dynamic RAM (DRAM), static RAM (SRAM), synchronous dynamic RAM (SDRAM)) and a non-volatile memory (for example, one time programmable ROM (OTPROM), programmable ROM (PROM), erasable and programmable ROM (EPROM), electrically erasable and programmable ROM (EEPROM), mask ROM, flash ROM, NAND flash memory, and NOR flash memory).

According to an embodiment of the present disclosure, the internal memory 1132 is a Solid State Drive (SSD). The external memory 1134 further includes flash drive, for example, compact flash (CF), secure digital (SD), micro Micro-SD, Mini-SD, extreme digital (xD), or a memorystick. The external memory 1134 can be functionally connected to the electronic device 1100 through various interfaces. According to an embodiment of the present disclosure, the electronic device 1100 further includes a storage device (or a storage medium) such as a hard drive.

The sensor module 1140 measures physical quantities or detects an operating state of the electronic device 1100, thereby converting the measured or detected information into electrical signals. The sensor module 1140 includes at least one of a gesture sensor 1140A, a gyro sensor 1140B, a barometric pressure sensor 1140C, a magnetic sensor 1140D, an acceleration sensor 1140E, a grip sensor 1140F, a proximity sensor 1140G, a color sensor 1140H (for example, a red, green, blue (RGB) sensor), a biometric sensor 1140I, a temperature/humidity sensor 1140J, an illumination sensor 1140K, or an ultra violet (UV) sensor 1140M. Additionally or alternatively, the sensor module 1140 includes an E-nose sensor (not shown), an electromyography (EMG) sensor, an electroencephalogram (EEG) sensor (not shown), an electrocardiogram (ECG) sensor (not shown), an infra red (IR) sensor (not shown), an iris sensor (not shown), or a fingerprint sensor (not shown). The sensor module 1140 further includes a control circuit for controlling at least one sensor therein.

The input device 1150 (for example, the input module 110 or 210) includes a touch panel 1152, a (digital) pen sensor 1154, a key 1156, or an ultrasonic input device 1158. The touch panel 1152 recognizes a touch input through at least one of capacitive, resistive, infrared, or ultrasonic methods, for example. Additionally, the touch panel 1152 further includes a control circuit. In the case of the capacitive method, both direct touch and proximity recognition are possible. The touch panel 1152 further includes a tactile layer. In this case, the touch panel 1152 provides a tactile response to a user.

The (digital) pen sensor 1154 can be implemented through a method similar or identical to that of receiving a user's touch input or an additional sheet for recognition. The key 1156 can include a physical button, an optical key, or a keypad, for example. The ultrasonic input device 1158, as a device checking data by detecting sound waves through a microphone (for example, a microphone 1188) in the electronic device 1100, can provide wireless recognition through an input tool generating ultrasonic signals. According to an embodiment of the present disclosure, the electronic device 1100 can receive a user input from an external device (for example, a computer or a server) connected thereto through the communication module 1120.

The display 1160 (for example, the display 130 or 230) includes a panel 1162, a hologram device 1164, or a projector 1166. The panel 1162 includes a liquid-crystal display (LCD) or an active-matrix organic light-emitting diode (AM-OLED). The panel 1162 can be implemented to be flexible, transparent, or wearable, for example. The panel 1162 and the touch panel 1152 can be configured with one module. The hologram 1164 can show three-dimensional images in the air by using the interference of light. The projector 1166 can display an image by projecting light on a screen. The screen, for example, can be placed inside or outside the electronic device 1100. According to an embodiment of the present disclosure, the display 1160 further includes a control circuit for controlling the panel 1162, the hologram device 1164, or the projector 1166.

The interface 1170 includes a high-definition multimedia interface (HDMI) 1172, a universal serial bus (USB) 1174, an optical interface 1176, or a D-subminiature (sub) 1178, for example. Additionally or alternatively, the interface 1170 includes a mobile high-definition link (MHL) interface, a secure Digital (SD) card/multi-media card (MMC) interface, or an infrared data association (IrDA) standard interface.

The audio module 1180 converts sound into electrical signals and convert electrical signals into sounds. The audio module 1180 can process sound information inputted, or outputted, or both, through a speaker 1182, a receiver 1184, an earphone 1186, or a microphone 1188.

The camera module 1191, as a device for capturing a still image and a video, can include at least one image sensor (for example, a front sensor or a rear sensor), a lens (not shown), an image signal processor (ISP) (not shown), or a flash (not shown) (for example, an LED or a xenon lamp).

The power management module 1195 manages the power of the electronic device 1100. Although not shown in the drawings, the power management module 1195 can include a power management IC (PMIC), a charger IC, or a battery or fuel gauge, for example.

The PMIC can be built in an IC or SoC semiconductor, for example. A charging method can be classified into a wired method and a wireless method. The charger IC can charge a battery and can prevent overvoltage or overcurrent flow from a charger. According to an embodiment of the present disclosure, the charger IC can include a charger IC for at least one of a wired charging method and a wireless charging method. As the wireless charging method, for example, there is a magnetic resonance method, a magnetic induction method, or an electromagnetic method. An additional circuit for wireless charging, for example, a circuit such as a coil loop, a resonant circuit, or a rectifier circuit, can be added.

The battery gauge measures the remaining amount of the battery 1196, or a voltage, current, or temperature of the battery 1196 during charging. The battery 1196 stores or generates electricity and supplies power to the electronic device 1100 by using the stored or generated electricity. The battery 1196, for example, can include a rechargeable battery or a solar battery.

The indicator 1197 displays a specific state of the electronic device 1100 or part thereof (for example, the AP 1110), for example, a booting state, a message state, or a charging state. The motor 1198 converts electrical signals into mechanical vibration. Although not shown in the drawings, the electronic device 1100 includes a processing device (for example, a GPU) for mobile TV support. A processing device for mobile TV support can process media data according to the standards such as digital multimedia broadcasting (DMB), digital video broadcasting (DVB), or media flow.

Each of the above-mentioned components of the electronic device according to various embodiments of the present disclosure can be configured with at least one component and the name of a corresponding component can vary according to the kind of an electronic device. An electronic device according to various embodiments of the present disclosure can include at least one of the above-mentioned components, can not include some of the above-mentioned components, or can further include another component. Additionally, some of components in an electronic device according to various embodiments of the present disclosure are configured as one entity, so that functions of previous corresponding components are performed identically.

Figure 12:
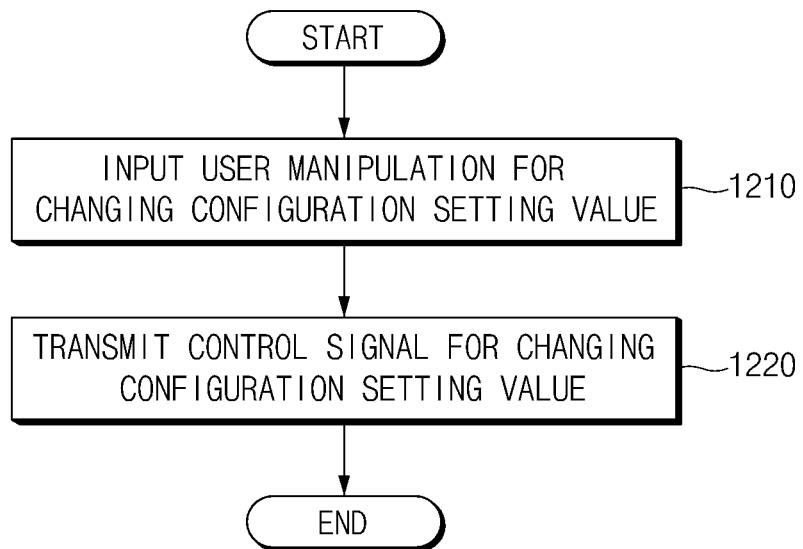
FIG. 12 is a flowchart illustrating a control method of a wearable electronic device according to various embodiments of the present disclosure.

FIG. 12 is a flowchart illustrating a control method of a wearable electronic device according to various embodiments of the present disclosure.

Referring to FIG. 12, the wearable electronic device 100 receives a user manipulation for changing a configuration setting value of the main electronic device 200 in operation 1210. For example, the wearable electronic device 100 receives a touch manipulation of a specified pattern on a touch screen. For example, as described with reference to FIG. 7, the wearable electronic device 100 receives a touch manipulation in a diagonal direction of the touch screen. According to an embodiment of the present disclosure, the wearable electronic device 100 receives a user manipulation through a UI that a display screen provides.

When a user manipulation is inputted, the wearable electronic device 100 transmits to the main electronic device 200 a control signal for changing a configuration setting value of the main electronic device 200.

According to an embodiment of the present disclosure, the wearable electronic device 100 transmits a configuration setting value to the main electronic device 200 in order to chare the configuration setting value with the main electronic device 200. The wearable electronic device 100 receives a configuration setting value of the main electronic device 200 from the main electronic device 200.

According to an embodiment of the present disclosure, the wearable electronic device 100 synchronizes a configuration setting value with that of the main electronic device 200. For example, if a configuration setting value of the wearable electronic device 100 and a configuration setting value of the main electronic device 200 are different from each other, the wearable electronic device 100 can synchronize its configuration setting value with the most recently changed configuration setting value. For another example, if the wearable electronic device 100 has a different configuration setting value from the main electronic device 200, it can synchronize its configuration setting value with a configuration setting value of the main electronic device 200.

Figure 13:
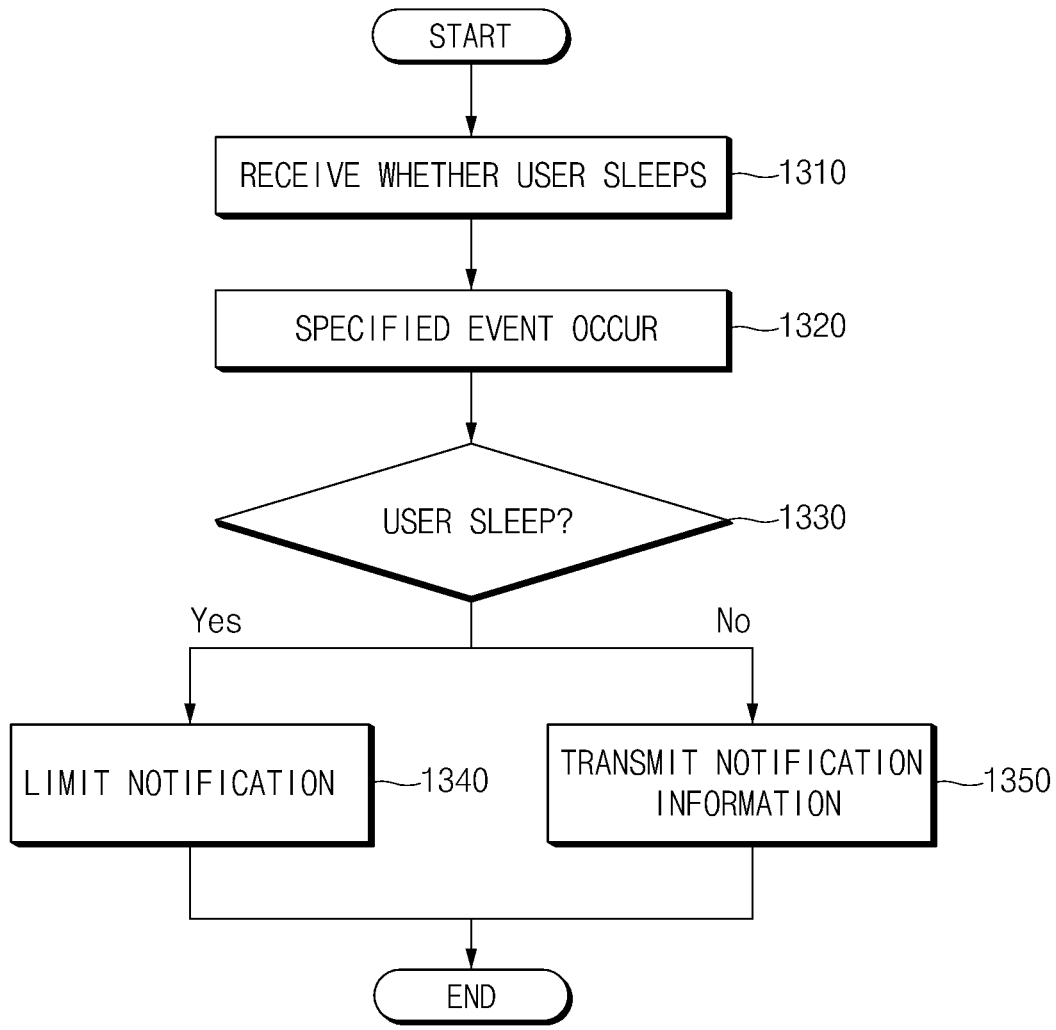
FIG. 13 is a flowchart illustrating a control method of a main electronic device according to various embodiments of the present disclosure.

FIG. 13 is a flowchart illustrating a control method of a main electronic device according to various embodiments of the present disclosure.

Referring to FIG. 13, the main electronic device 200 can receive whether a user sleeps from the wearable electronic device 100 in operation 1310. When a specified event (for example, SMS message reception) occurs in operation 1320, the main electronic device 200 can determine whether a user sleeps in operation 1330.

When the user sleeps in operation 1330 (Yes), the main electronic device 200 limits notification transmission to the wearable electronic device 100 in operation 1340. When the user does not sleep in operation 1330 (No), the main electronic device 200 transmits notification information relating to the event to the wearable electronic device 100 in operation 1350.

According to an embodiment of the present disclosure, the main electronic device 200 can receive whether the wearable electronic device 100 is worn, whether a specified user wears the wearable electronic device 100, a battery state, whether the wearable electronic device 100 is in charging, and the current location from the wearable electronic device 100 in operation 1310. The main electronic device 200 determines whether the wearable electronic device 100 is worn, whether a specified user wears the wearable electronic device 100, whether the wearable electronic device 100 is in charging, and whether the current location is a specified location in operation 1330. Then, the main electronic device 200 limits a notification or transmits notification information to the wearable electronic device 100 according to a determination result.

Figure 14:
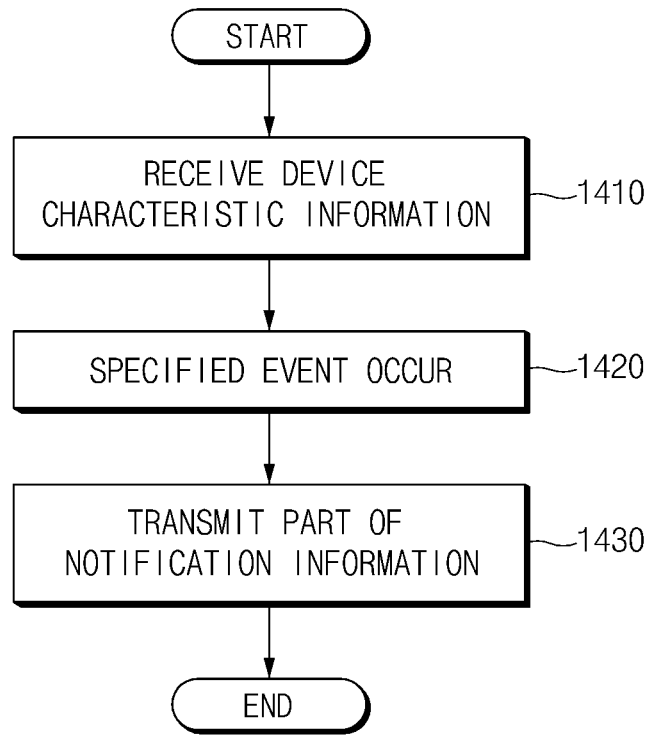
FIG. 14 is a flowchart illustrating a control method of a main electronic device according to various embodiments of the present disclosure.

FIG. 14 is a flowchart illustrating a control method of a main electronic device according to various embodiments of the present disclosure.

Referring to FIG. 14, the main electronic device 200 receives device characteristic information from the wearable electronic device 100 in operation 1410. When a specified event occurs in operation 1420, the main electronic device 200 transmits part of notification information to the wearable electronic device 100 according to the device characteristic information in operation 1430. For example, when the wearable electronic device 100 is a smart watch, the main electronic device 200 transmits only text of notification information including the text and images. For another example, when the wearable electronic device 100 is smart glasses, the main electron is device 200 transmits only images of notification information including text and the images.

According to an embodiment of the present disclosure, when entire notification in formation is requested from the wearable electronic device 100, the main electronic device 200 transmits the entire notification information to the wearable electronic device 100.

Figure 15:
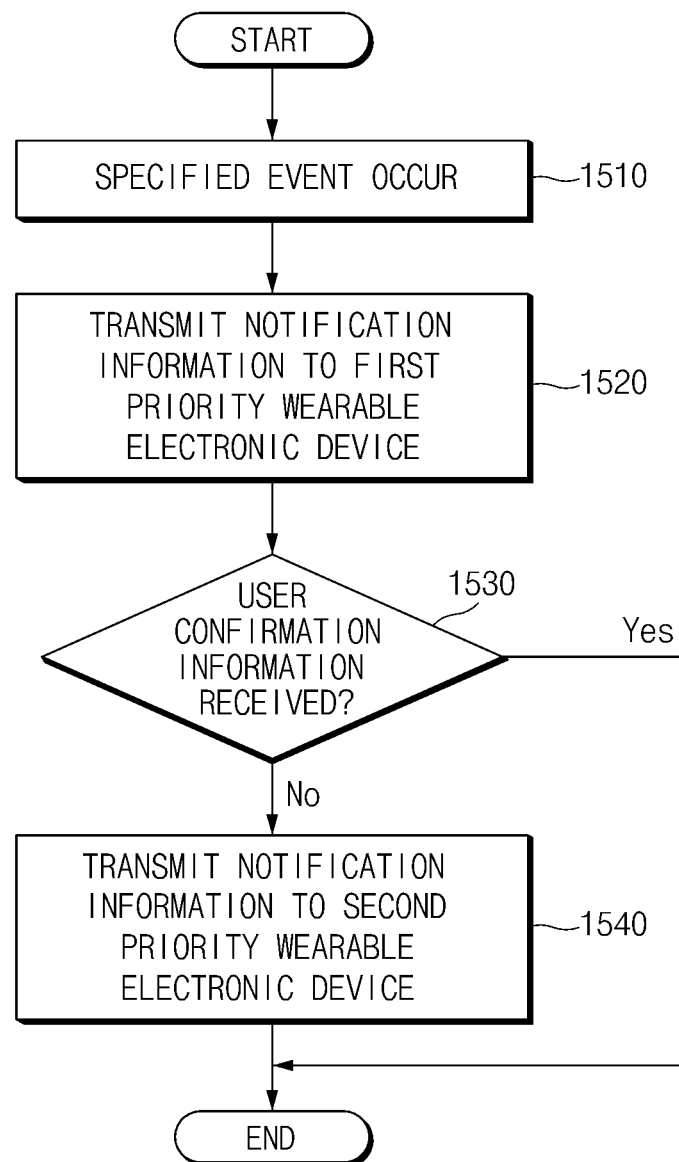
FIG. 15 is a flowchart illustrating a control method of a main electronic device according to various embodiments of the present disclosure.

FIG. 15 is a flowchart illustrating a control method of a main electronic device according to various embodiments of the present disclosure.

Referring to FIG. 15, when a specified event (for example, SMS message reception) occurs in operation 1510, the main electronic device 200 transmits notification information according to a priority. The main electronic device 200 sets a priority on the plurality of wearable electronic devices connected via network. According to an embodiment of the present disclosure, the main electronic device 200 sets a priority according to a user manipulation or characteristics of a wearable electronic device. For example, the first wearable electronic device 100-1 can be set to the first priority and the second wearable electronic device 100-2 can be set to the second priority. When a specified event occurs in operation 1510, the main electronic device 200 can transmit notification information to the first wearable electronic device 100-1 of the first priority in operation 1520.

When a specified time elapses after transmitting the notification information, the main electronic device 200 determines whether the notification confirmation information is received in operation 1530. When the notification confirmation information is received in operation 1530 (Yes), the main electronic device 200 terminates the process. When the notification confirmation information is not received in operation 1530 (No), the main electronic device 200 can transmit the notification information to the second wearable electronic device 100-2 of the second priority in operation 1540.

The control method of the wearable electronic device or the main electronic device according to the above-mentioned various embodiments of the present disclosure can be implemented with a program executable on an electronic device. Then, such a program can be stored in various types of recording media and used.

According to various embodiments of the present disclosure, information is transmitted according to a user's state or a state of a wearable electronic device so that user's inconvenience or power consumption can be minimized.

According to various embodiments of the present disclosure, a configuration setting value of a main electronic device can be changed by using a wearable electronic device and a user's convenience can be improved by uniformly changing a configuration setting value of an electronic device connected via network.

According to various embodiments of the present disclosure, services suitable for the characteristics of a wearable electronic device can be provided.

In more detail, program code for performing the above method can be stored in various types of nonvolatile recording media such as flash memory, Read Only Memory (ROM), Erasable Programmable ROM (EPROM), Electronically Erasable and Programmable ROM (EEPROM), hard disk, removable disk, memory card, USB memory, and CD-ROM.

Although various embodiments of the present disclosure have been particularly shown and described, the present disclosure is not limited to the above-mentioned specific embodiments and it should be understood by those skilled in the art that various modified embodiments are possible without departing from the technical idea and outlook of the present disclosure.

What is claimed is:

1. A mobile phone, comprising:
   a display;
   a communication circuit;
   a memory configured to store instructions; and
   at least one processor configured to execute the stored instructions to:
   control the communication circuit to establish a wireless connection between a wearable electronic device and the mobile phone,
   display, on the display of the mobile phone, a user interface (UI) including an object for selecting a user configuration setting of a notification function of the mobile phone to one of activate or deactivate the notification function of the mobile phone, wherein the notification function includes displaying notification information on an event of the mobile phone, and wherein deactivating the notification function causes the notification information on the event of the mobile phone not to be displayed,
   receive, via the display, a touch input via the object included in the displayed UI, in response to receiving the touch input, change the user configuration setting of the notification function of the mobile phone to activate or deactivate the notification function of the mobile phone, and control the communication circuit to transmit a first control signal to the wearable electronic device such that a user configuration setting of a notification function of the wearable electronic device is activated or deactivated according to the changed user configuration setting of the notification function of the mobile phone, apply, in response to a difference between the user configuration setting of the notification function of the wearable electronic device and the user configuration setting of the notification function of the mobile phone, a more recently changed user configuration setting from the user configuration setting of the notification function of the wearable electronic device and the user configuration setting of the notification function of the mobile phone as the user configuration setting of the notification function of the mobile phone, receive, from the wearable electronic device, information indicating whether a user of the wearable electronic device is sleeping, after receiving the information, receive a short message service (SMS) message, determine whether the user is sleeping using the information, when the user is determined to be sleeping, refrain from transmitting a notification related to the SMS message to the wearable electronic device, when the user is determined to be awake, transmit the notification related to the SMS message to the wearable electronic device, after transmitting the notification related to the SMS message, determine whether confirmation for the notification is received from the wearable electronic device, and when the confirmation is not received from the wearable electronic device for a specified time after transmitting the notification, transmit the notification to another wearable electronic device.

2. The mobile phone of claim 1, wherein the at least one processor is further configured to:
control the communication circuit to receive, from the wearable electronic device, a second control signal based on a user configuration setting of the notification function of the wearable electronic device.

3. The mobile phone of claim 2, wherein the at least one processor is further configured to:
change the user configuration setting of the notification function of the mobile phone based on the second control signal.

4. The mobile phone of claim 2, wherein the at least one processor is further configured to:
wherein the second control signal indicates whether the notification function of the wearable electronic device is activated or deactivated.

5. The mobile phone of claim 2, wherein the at least one processor is further configured to:
control the communication circuit to receive, from the wearable electronic device, the second control signal based on the user configuration setting of the notification function of the wearable electronic device at predetermined periods.

6. The mobile phone of claim 2, wherein applying the more recently changed user configuration setting synchronizes the user configuration setting of the notification function of the mobile phone with the user configuration setting of the notification function of the wearable electronic device, and wherein the user configuration setting of the notification function of the wearable electronic device is obtained based on the second control signal.

7. The mobile phone of claim 2, wherein, to apply the more recently changed user configuration setting, the at least one processor is further configured to:
select the more recently changed user configuration setting from the user configuration setting of the notification function of the wearable electronic device and the user configuration setting of the notification function of the mobile phone, wherein the user configuration setting of the notification function of the wearable electronic device is obtained based on the second control signal.

8. The mobile phone of claim 1, wherein the at least one processor is further configured to:
control the communication circuit to transmit the first control signal to the wearable electronic device when the user configuration setting of the notification function of the mobile phone is changed.

9. The mobile phone of claim 1, wherein the user configuration setting of the notification function of the mobile phone corresponds to activation or deactivation of the notification function of the mobile phone.

10. The mobile phone of claim 9, wherein the at least one processor further configured to cause the mobile phone to enter into an interference prohibition mode when the notification function is deactivated.

11. The mobile phone of claim 1, wherein the at least one processor is configured to control the communication circuit to establish the wireless connection between the wearable electronic device and the mobile phone using a Bluetooth communication.

12. A system, comprising:
a main electronic device; and
a wearable electronic device connected by a wireless connection with the main electronic device,
wherein the main electronic device is configured to:
display, on a display of the main electronic device, a user interface (UI) including an object for selecting a user configuration setting of a notification function of the main electronic device, wherein the user configuration setting of the notification function of the main electronic device is for activation or deactivation of the notification function of the main electronic device, and wherein the notification function includes displaying notification information on an event of the main electronic device, and wherein deactivating the notification function causes the notification information on the event of the main electronic device not to be displayed,
receive, via the display of the main electronic device, a touch input via the object included in the displayed UI,
in response to receiving the touch input, change the user configuration setting of the notification function of the main electronic device to activate or deactivate the notification function of the main electronic device,
transmit a first control signal to the wearable electronic device such that a user configuration setting of a notification function of the wearable electronic device is changed according to the changed user configuration setting of the notification function of the main electronic device,
receive, from the wearable electronic device, information indicating whether a user of the wearable electronic device is sleeping,
after receiving the information, receive a short message service (SMS) message,
determine whether the user is sleeping using the information,
when the user is determined to be sleeping, refrain from transmitting a notification related to the SMS message to the wearable electronic device,
when the user is determined to be awake, transmit the notification related to the SMS message to the wearable electronic device,
after transmitting the notification related to the SMS message, determine whether confirmation for the notification is received from the wearable electronic device, and
when the confirmation is not received from the wearable electronic device for a specified time after transmitting the notification, transmit the notification to another wearable electronic device, and
wherein the wearable electronic device is configured to:
detect whether the user of the wearable electronic device is in sleep,
transmit, to the main electronic device, the information indicating whether the user of the wearable electronic device is sleep,
receive, from the main electronic device, the first control signal through the wireless connection,
in response to the first control signal, change the user configuration setting of the notification function of the wearable electronic device based on the received first control signal, and
when the notification related to the SMS message is received from the main electronic device, determine whether to provide the notification based on the user configuration setting of the notification function of the wearable electronic device,
wherein the main electronic device and the wearable electronic device perform synchronization by applying, in response to a difference between the user configuration setting of the notification function of the wearable electronic device and the user configuration setting of the notification function of the main electronic device, a more recently changed user configuration setting from the user configuration setting of the notification function of the wearable electronic device and the user configuration setting of the notification function of the main electronic device as the user configuration setting of the notification function of the main electronic device and the user configuration setting of the notification function of the wearable electronic device.

13. The system of claim 12, wherein the main electronic device and the wearable electronic device perform synchronization when the user configuration setting of the notification function of the main electronic device and the user configuration setting of the notification function of the wearable electronic device are different.

14. The system of claim 12, wherein the user configuration setting of the notification function of the main electronic device corresponds to activation or deactivation of the notification function of the main electronic device, and the user configuration setting of the notification function of the wearable electronic device corresponds to activation or deactivation of the notification function of the wearable electronic device.

15. The system of claim 12, wherein the main electronic device further configured to cause the main electronic device to enter into an interference prohibition mode when the notification function of the main electronic device is deactivated, and
wherein the wearable electronic device further configured to cause the wearable electronic device to enter into an interference prohibition mode when the notification function of the wearable electronic device is deactivated.

16. The system of claim 12, wherein the wearable electronic device further configured to cause the wearable electronic device to:
display, on a display of the wearable electronic device, a UI including an object for selecting the user configuration setting of the notification function of the wearable electronic device, wherein the user configuration setting of the notification function is for activation or deactivation of the notification function of the wearable electronic device,
receive, via the display of the wearable electronic device, a touch input via the object included in the displayed UI,
in response to receiving the touch input, change the user configuration setting of the notification function of the wearable electronic device to activate or deactivate the notification function of the wearable electronic device, and
transmit a second control signal to the main electronic device such that the user configuration setting of the notification function of the main electronic device is changed according to the changed user configuration setting of the notification function of the wearable electronic device, and
wherein the main electronic device further configured to cause the main electronic device to:
receive, from the wearable electronic device, the second control signal through the wireless connection, and
in response to the second control signal, change the user configuration setting of the notification function of the main electronic device based on the received second control signal.

17. The system of claim 12, wherein, to apply the more recently changed user configuration setting, the main electronic device and the wearable electronic device are further configured to:
select the more recently changed user configuration setting from the user configuration setting of the notification function of the wearable electronic device and the user configuration setting of the notification function of the main electronic device.

18. A mobile phone, comprising:
a display;
a communication circuit;
a memory configured to store instructions; and
at least one processor configured to execute the stored instructions to:
control the communication circuit to establish a wireless connection between a wearable electronic device and the mobile phone,
display, on the display of the mobile phone, a user interface (UI) including a first object for selecting a user configuration setting of a notification function of the mobile phone and a second object for selecting a user configuration setting of a wireless fidelity (Wi-Fi) connection of the mobile phone, wherein the user configuration setting of the notification function is for activation or deactivation of the notification function of the mobile phone and the user configuration setting of the Wi-Fi connection is for activation or deactivation of the Wi-Fi connection of the mobile phone, wherein the notification function includes displaying notification information on an event of the mobile phone, identify, via the display, a touch input via the first object or the second object included in the displayed UI, in response to identifying the touch input via the first object:
- change the user configuration setting of the notification function of the mobile phone, and
- control the communication circuit to transmit a first control signal to the wearable electronic device such that a user configuration setting of a notification function of the wearable electronic device is changed according to the changed user configuration setting of the notification function of the mobile phone, and in response to identifying the touch input via the second object:
- change the user configuration setting of the Wi-Fi connection of the mobile phone, and
- control the communication circuit to transmit a second control signal to the wearable electronic device such that a user configuration setting of a Wi-Fi connection of the wearable electronic device is changed according to the changed user configuration setting of the Wi-Fi connection of the mobile phone,
- select, in response to a difference between the user configuration setting of the notification function of the wearable electronic device and the user configuration setting of the notification function of the mobile phone, a more recently changed user configuration setting from the user configuration setting of the notification function of the wearable electronic device and the user configuration setting of the notification function of the mobile phone as the user configuration setting of the notification function of the mobile phone,
- receive, from the wearable electronic device, information indicating whether a user of the wearable electronic device is sleeping,
- after receiving the information, receive a short message service (SMS) message,
- determine whether the user is sleeping using the information,
- when the user is determined to be sleeping, refrain from transmitting a notification related to the SMS message to the wearable electronic device,
- when the user is determined to be awake, transmit the notification related to the SMS message to the wearable electronic device,
- after transmitting the notification related to the SMS message, determine whether confirmation for the notification is received from the wearable electronic device, and
- when the confirmation is not received from the wearable electronic device for a specified time after transmitting the notification, transmit the notification to another wearable electronic device.

19. The mobile phone of claim 18, wherein the at least one processor is further configured to:
control the communication circuit to receive, from the wearable electronic device, a third control signal based on the user configuration setting of the notification function of the wearable electronic device or a fourth control signal based on the user configuration setting of the Wi-Fi connection of the wearable electronic device.

20. The mobile phone of claim 19, wherein the user configuration setting of the notification function of the wearable electronic device is obtained based on the third control signal.

21. The mobile phone of claim 20, wherein the at least one processor is further configured to:
control the communication circuit to transmit a fifth control signal to the wearable electronic device such that the user configuration setting of the notification function of the wearable electronic device is changed according to the selected the more recently changed user configuration setting.

22. The mobile phone of claim 19, wherein the user configuration setting of the notification function of the wearable electronic device is obtained based on the third control signal, and wherein the at least one processor is further configured to:
select a more recently changed user configuration setting from the user configuration setting of the Wi-Fi connection of the wearable electronic device and the user configuration setting of the Wi-Fi connection of the mobile phone as the user configuration setting of the Wi-Fi connection of the mobile phone, the user configuration setting of the Wi-Fi connection of the wearable electronic device being obtained based on the fourth control signal.

* * * * *